(12) United States Patent
Neuman

(10) Patent No.: US 10,946,705 B1
(45) Date of Patent: Mar. 16, 2021

(54) FLIGHT MODULE FOR AN AERIAL VEHICLE

(71) Applicant: Toyota Motor Engineering & Manufacturing North America, Inc., Plano, TX (US)

(72) Inventor: Tom M. Neuman, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 126 days.

(21) Appl. No.: 16/040,956

(22) Filed: Jul. 20, 2018

Related U.S. Application Data

(60) Provisional application No. 62/579,647, filed on Oct. 31, 2017.

(51) Int. Cl.
*B60F 5/02* (2006.01)
*B64C 1/06* (2006.01)
*B64C 27/08* (2006.01)
*B64C 27/50* (2006.01)
*B64C 37/00* (2006.01)

(52) U.S. Cl.
CPC ........... *B60F 5/02* (2013.01); *B64C 1/063* (2013.01); *B64C 27/08* (2013.01); *B64C 27/50* (2013.01); *B64C 37/00* (2013.01)

(58) Field of Classification Search
CPC ....... B64C 11/28; B64C 27/022; B64C 27/50; B64C 1/063
USPC ......................................................... 416/142
See application file for complete search history.

(56) References Cited

U.S. PATENT DOCUMENTS

| | | | |
|---|---|---|---|
| 994,966 A * | 6/1911 | Woodington | ........... B64C 27/82 244/17.21 |
| 3,016,217 A * | 1/1962 | Polleys | .................... B64D 1/02 244/138 A |
| 3,321,021 A | 5/1967 | Girard | |
| 3,582,021 A | 6/1971 | Pender | |
| 3,762,667 A | 10/1973 | Pender | |
| 4,071,206 A | 1/1978 | Magill | |

(Continued)

FOREIGN PATENT DOCUMENTS

KR 20160119988 A 10/2016

*Primary Examiner* — Nathaniel E Wiehe
*Assistant Examiner* — Brian O Peters
(74) *Attorney, Agent, or Firm* — Christopher G. Darrow; Darrow Mustafa PC

(57) ABSTRACT

A flight module includes a rotor and a rotor carrier. The rotor carrier includes an elongate, upstanding carriage rail, a carriage supported for movement along the carriage rail, an elongate rotor arm carrying the rotor and supported atop the carriage rail for pivotation, and an elongate strut pivotally mounted between the carriage and the rotor arm. The pivotation includes pivotation between alongside the carriage rail, where the rotor arm retentively carries the rotor in a stowage position, and overhanging the carriage rail, where the rotor arm retentively carries the rotor with a skyward-facing orientation in a flight position. With movement of the carriage along the carriage rail, the strut transfers loading between the carriage and the rotor arm for pivoting the rotor arm between alongside the carriage rail and overhanging the carriage rail, and thereby carrying the rotor on the rotor arm between its stowage position and its flight position.

18 Claims, 13 Drawing Sheets

(56) References Cited

U.S. PATENT DOCUMENTS

| | | | |
|---|---|---|---|
| 4,197,056 A * | 4/1980 | Hutter | F03D 1/02 |
| | | | 416/132 B |
| 4,786,236 A | 11/1988 | Hahn et al. | |
| 6,783,327 B1 | 8/2004 | Davis | |
| 9,126,681 B1 | 9/2015 | Judge | |
| 9,156,550 B2 | 10/2015 | Nam | |
| 9,694,911 B2 | 7/2017 | Bevirt et al. | |
| 10,065,726 B1 * | 9/2018 | Phan | B64D 17/386 |
| 10,407,162 B2 * | 9/2019 | Datta | B64D 27/26 |
| 10,773,785 B2 | 9/2020 | Sugaki et al. | |
| 2013/0068876 A1 | 3/2013 | Radu | |
| 2016/0023527 A1 | 1/2016 | Dietrich | |
| 2016/0159471 A1 * | 6/2016 | Chan | B64C 27/08 |
| | | | 244/39 |
| 2016/0207368 A1 | 7/2016 | Gaonjur | |
| 2018/0093753 A1 | 4/2018 | Chow | |
| 2018/0105254 A1 * | 4/2018 | Tian | B64C 27/08 |
| 2018/0257764 A1 | 9/2018 | Gandhi et al. | |
| 2019/0112025 A1 | 4/2019 | Sugaki et al. | |

\* cited by examiner

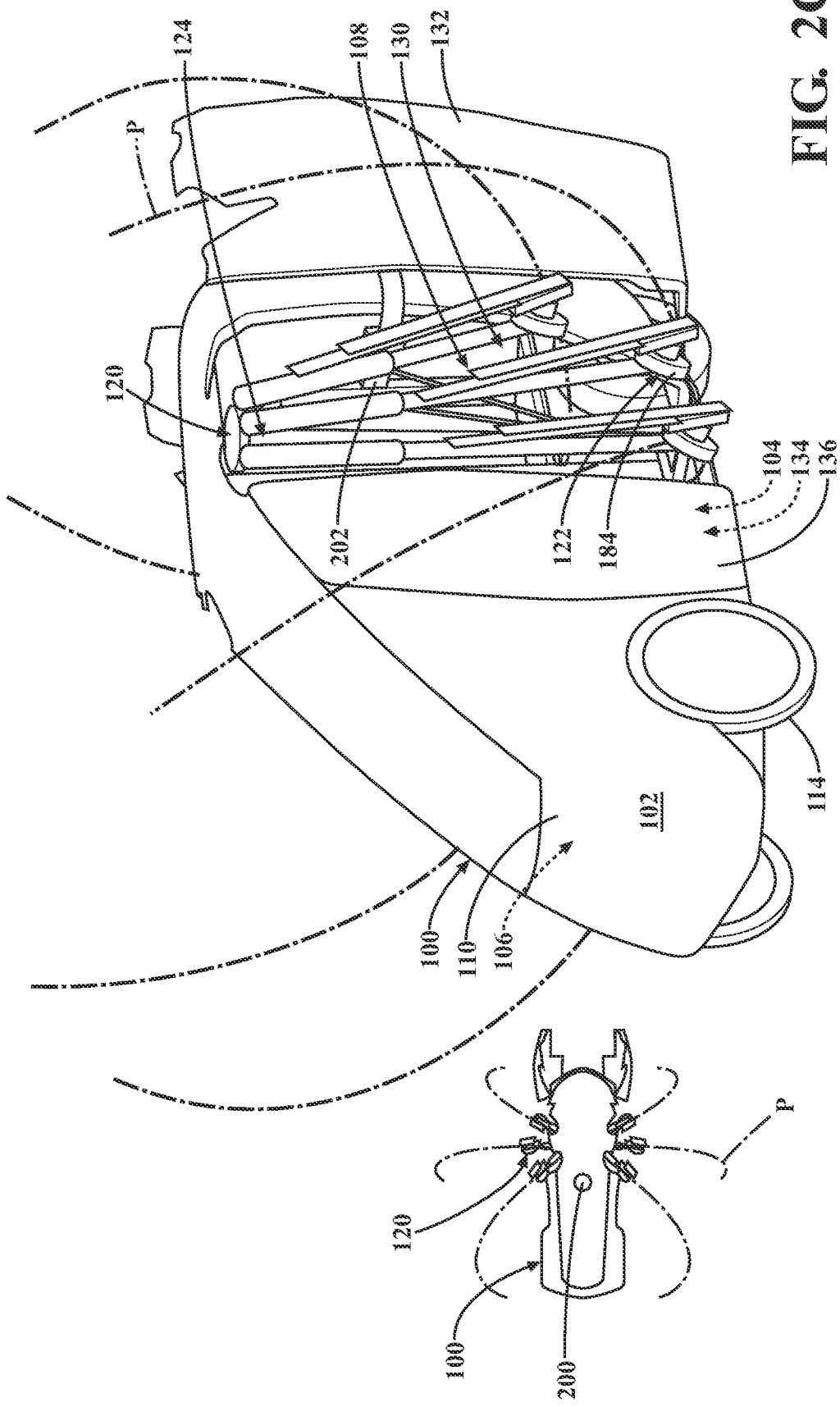

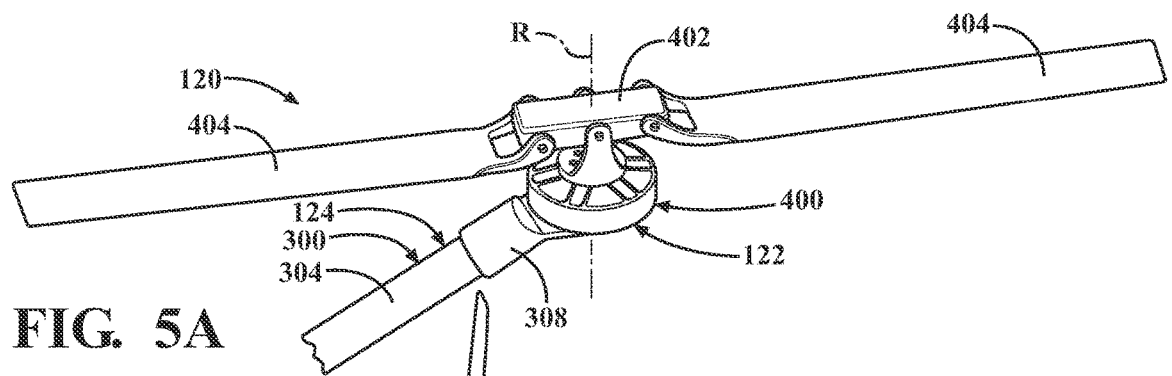
FIG. 5A
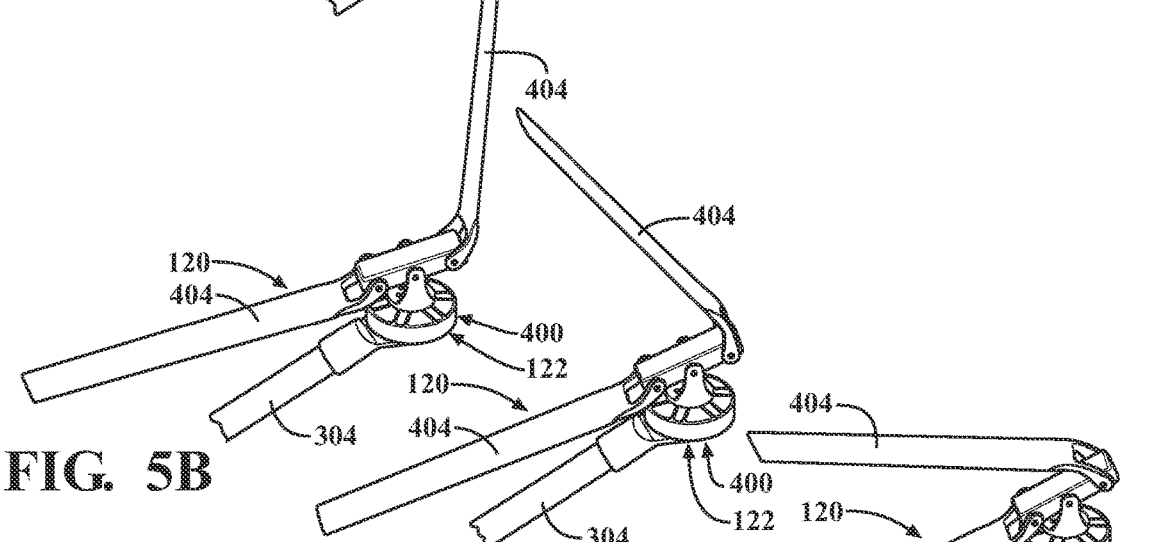
FIG. 5B
FIG. 5C
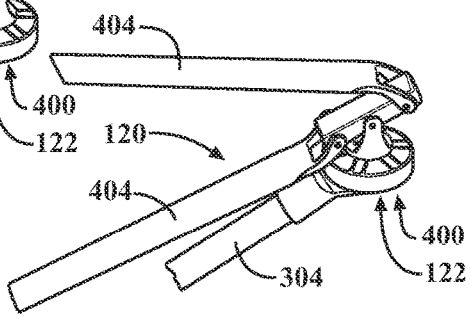
FIG. 5D
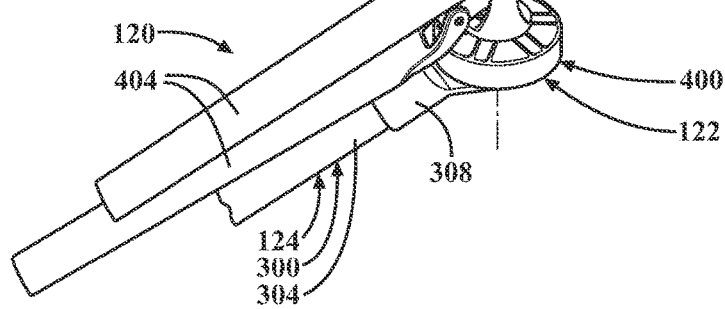
FIG. 5E

FLIGHT MODULE FOR AN AERIAL VEHICLE

CROSS REFERENCE TO RELATED APPLICATIONS

This application claims benefit of U.S. Provisional Application No. 62/579,647, filed on Oct. 31, 2017, which is herein incorporated by reference in its entirety.

TECHNICAL FIELD

The embodiments disclosed herein relate to vehicles and, more particularly, to aerial vehicles.

BACKGROUND

Aerial vehicles afford expanded travel options compared to ground-only vehicles. Some aerial vehicles are dual-mode vehicles that, in addition to having aerial mobility during a flight mode, have traditional ground mobility during a ground mode. In addition to affording expanded travel options compared to ground-only vehicles, dual-mode vehicles afford expanded travel options compared to aerial-only vehicles as well.

On the other hand, once they land back onto the ground, aerial vehicles suffer tradeoffs compared to ground-only vehicles. For instance, when aerial vehicles are maneuvered on the ground, their flight-critical equipment is often exposed to the threat of damage from the surrounding environment. Moreover, their flight-critical equipment often renders aerial vehicles larger and more difficult to maneuver on the ground than ground-only vehicles. Relatedly, in the case of dual-mode vehicles, although having ground mobility during the ground mode, the tradeoffs of aerial vehicles impair the practicality and driving dynamics on the ground that users of ground-only vehicles are accustomed to.

SUMMARY

Disclosed herein are embodiments of a flight module, the components of a flight module, an aerial vehicle with a flight module, and/or an aerial vehicle with the components of a flight module. In one aspect, a flight module includes a rotor operable to generate aerodynamic force, and a rotor carrier. The rotor carrier includes an elongate, upstanding carriage rail, a carriage supported for movement along the carriage rail, an elongate rotor arm carrying the rotor and supported atop the carriage rail for pivotation, and an elongate strut pivotally mounted between the carriage and the rotor arm. The pivotation of the rotor arm includes pivotation between alongside the carriage rail, where the rotor arm retentively carries the rotor in a stowage position, and overhanging the carriage rail, where the rotor arm retentively carries the rotor with a skyward-facing orientation in a flight position. With movement of the carriage along the carriage rail, the strut transfers loading between the carriage and the rotor arm for pivoting the rotor arm between alongside the carriage rail and overhanging the carriage rail, and thereby carrying the rotor on the rotor arm between its stowage position and its flight position.

In another aspect, a flight module includes rotors operable to generate aerodynamic force, and a set of rotor carriers. The set of rotor carriers includes a shared elongate, upstanding carriage rail, a shared carriage supported for movement along the carriage rail, an elongate rotor arm per rotor each carrying a rotor and supported atop the carriage rail for pivotation, and an elongate strut per rotor arm pivotally mounted between the carriage and a rotor arm. The pivotation of each rotor arm includes pivotation between alongside the carriage rail, where the rotor arm retentively carries the rotor in a stowage position, and overhanging the carriage rail, where the rotor arm retentively carries the rotor with a skyward-facing orientation in a flight position. With movement of the carriage along the carriage rail, the struts transfer loading between the carriage and the rotor arms for pivoting the rotor arms between congregation alongside the carriage rail and branchingly overhanging the carriage rail, and thereby carrying the rotors on the rotor arms between their stowage positions and their flight positions.

In yet another aspect, a flight module includes a rotor operable to generate aerodynamic force, a rotor arm mount defining a single rotational degree of freedom, and an elongate rotor arm carrying the rotor and pivotally mounted by the rotor arm mount. The rotor arm is non-perpendicular to the rotor arm mount, and the rotor arm mount directs pivotation of the rotor arm with which the rotor arm sweeps along a conical surface. The pivotation of the rotor arm includes pivotation between where the rotor arm retentively carries the rotor in a stowage position and where the rotor arm retentively carries the rotor with a skyward-facing orientation in a flight position.

These and other aspects will be described in additional detail below.

BRIEF DESCRIPTION OF THE DRAWINGS

The various features, advantages and other uses of the present embodiments will become more apparent by referring to the following detailed description and drawing in which:

FIGS. 2A-2G are portrayals of the aerial vehicle using corresponding perspective views and top views, showing the aerial vehicle being switched from the ground mode to the flight mode, including, as part of the flight module being reconfigured from the stowage configuration to the flight configuration, the rotor frame being reconfigured from a collapsed configuration to an expanded configuration, and the rotors being reconfigured from packaged configurations to open configurations;

FIGS. 5A-5E are portrayals of the flight module in isolation from the aerial vehicle using partial perspective views, further showing a representative rotor being reconfigured from an open configuration to a packaged configuration.

DETAILED DESCRIPTION

This disclosure teaches an aerial vehicle equipped with an onboard flight module for aerial mobility, and a wheeled drivetrain for traditional ground mobility. To promote ground mobility, while maintaining the benefit of aerial mobility, the flight module has both a flight configuration and a stowage configuration. In relation to the flight module, the aerial vehicle includes a body defining a stowage compartment. The flight module is supported by the body in the stowage compartment. Moreover, in the stowage configuration, the flight module is housed by the stowage compartment.

The flight module includes rotors with blades, and a rotor frame. The rotor frame is mounted to the body in the stowage compartment, and carries the rotors relative to the body. To realize the stowage configuration, the rotor frame is collapsed, and the rotors are packaged. The rotor frame thus congregates inboard the body and, with the rotor frame serving as its stowage platform, each rotor is tucked inboard the body in a stowage position. To realize the flight configuration, the rotor frame is expanded, and the rotors are opened. The rotor frame thus reaches from the body, beyond the stowage compartment, to outboard the body and, with the rotor frame serving as its flight platform, each rotor is perched outboard the body with a skyward-facing orientation in a flight position. Aerodynamic force generated by the rotors is thereby usable for flying the aerial vehicle through the air.

Aerial Vehicle with a Reconfigurable Flight Module

Figure 1A:
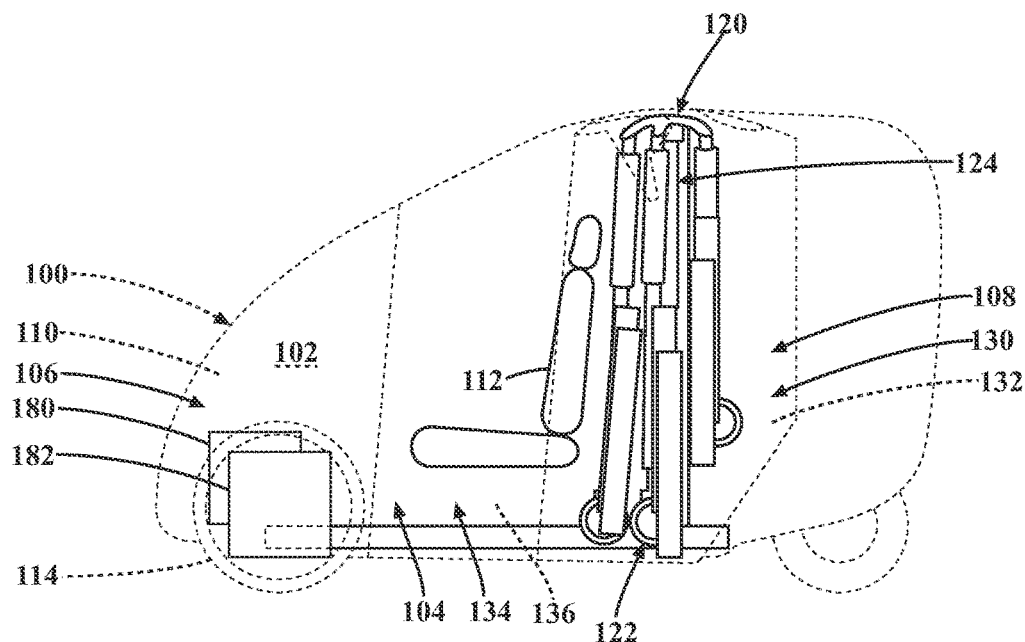
FIGS. 1A and 1B are portrayals of an aerial vehicle with a ground mode and a flight mode using side views, showing a body defining a stowage compartment, a drivetrain with wheels supported by the body, and an onboard flight module with rotors and a rotor frame supported by the body in the stowage compartment, with the flight module having a stowage configuration during the ground mode, in which the flight module is housed by the stowage compartment, as represented in FIG. 1A, and a flight configuration during the flight mode, in which the flight module is deployed beyond the stowage compartment, as represented in FIG. 1B.
Figure 1B:
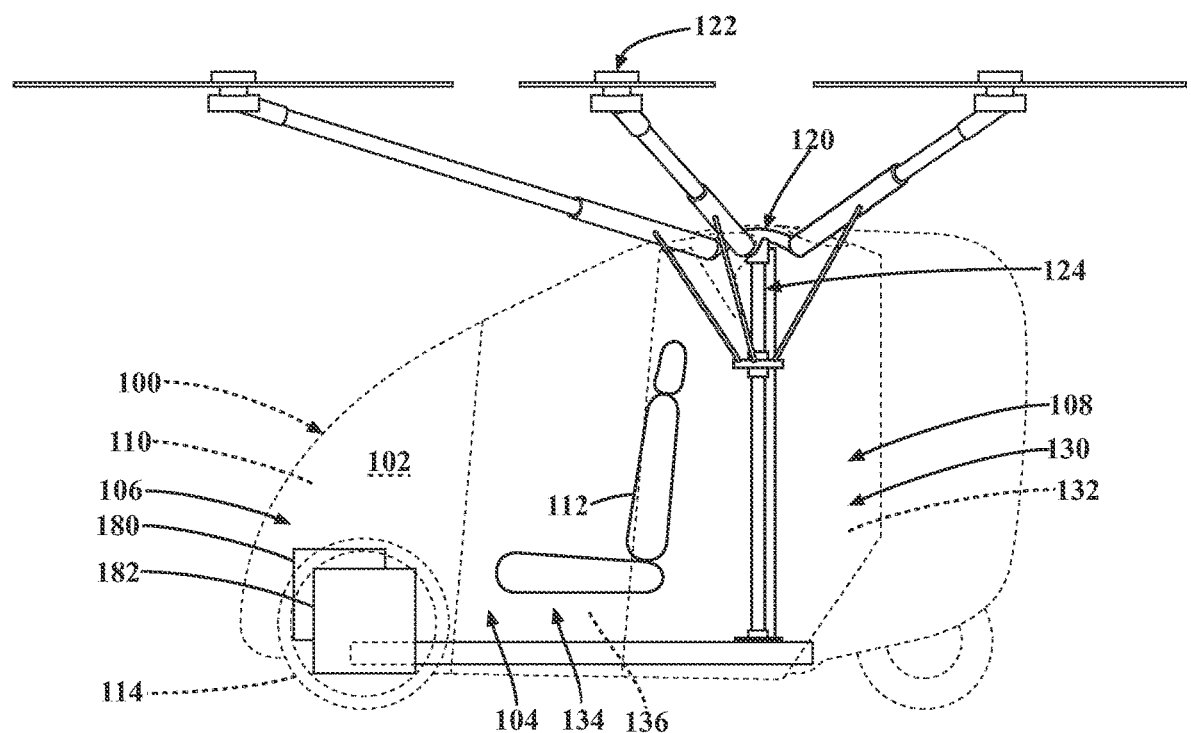

A representative aerial vehicle 100 is shown in FIGS. 1A and 1B. In this description, uses of "front," "forward" and the like, and uses of "rear," "rearward" and the like, refer to the longitudinal directions of the aerial vehicle 100. "Front," "forward" and the like refer to the front (fore) of the aerial vehicle 100, while "rear," "rearward" and the like refer to the back (aft) of the aerial vehicle 100. Uses of "side," "sideways," "transverse" and the like refer to the lateral directions of the aerial vehicle 100, with "driver's side" and the like referring to the left side of the aerial vehicle 100, and "passenger side" and the like referring to the right side of the aerial vehicle 100.

The aerial vehicle 100, as shown, is a multimode vehicle. Specifically, the aerial vehicle 100 is a dual-mode vehicle that, in addition to having aerial mobility during a flight mode, has traditional ground mobility during a ground mode.

The aerial vehicle 100 has an exterior 102 and a number of interior compartments. The compartments include a passenger compartment 104, an engine compartment 106 and a stowage compartment 108. The stowage compartment 108, as shown, is rear of the passenger compartment 104. The aerial vehicle 100 has a body 110 that forms its exterior 102 and defines its compartments. The body 110 has upright sides, as well as a floor, a front end, a rear end, a roof and the like. The aerial vehicle 100 may include, among other things, one or more seats 112 housed in its passenger compartment 104, as well as a dash assembly, an instrument panel, controls and the like.

For purposes of ground mobility during the ground mode, the aerial vehicle 100 has a wheeled drivetrain. The drivetrain is part of, mounted to or otherwise supported by the body 110. The drivetrain may be housed, in whole or in part, in any combination of the passenger compartment 104, the engine compartment 106, the stowage compartment 108 or elsewhere in the aerial vehicle 100. As part of the drivetrain, the aerial vehicle 100 includes wheels 114. In a configuration favoring urban mobility, the aerial vehicle 100 includes three wheels 114, two of which are front wheels 114, and one of which is a rear wheel 114. However, it will be understood that this disclosure is applicable in principle to otherwise similar aerial vehicles 100 including one wheel 114, as well as otherwise similar aerial vehicles 100 otherwise including multiple wheels 114. During the ground mode, the wheels 114 support the remainder of the aerial vehicle 100 on the ground, and one, some or all of the wheels 114 are powered to drive the aerial vehicle 100 along the ground. For this purpose, also as part of the drivetrain, in addition to the wheels 114, the aerial vehicle 100 may include any penultimate combination of a transmission, a differential, a drive shaft and the like, to which the wheels 114 are mechanically connected.

For purposes of aerial mobility during the flight mode, the aerial vehicle 100 includes an onboard flight module 120. The flight module 120 is part of, mounted to or otherwise supported by the body 110 in the stowage compartment 108. As part of the flight module 120, the aerial vehicle 100 includes rotors 122 and a rotor frame 124. Each rotor 122 is operable to generate aerodynamic force when powered. The rotor frame 124 is mounted to the body 110 in the stowage compartment 108, and each rotor 122 is mounted to the rotor frame 124. With the rotor frame 124 thus mounted between the body 110 and the rotors 122, the rotor frame 124 carries the rotors 122 relative to the body 110.

To promote ground mobility during the ground mode, while maintaining the benefit of aerial mobility during the flight mode, the flight module 120 has a stowage configuration during the ground mode, as represented in FIG. 1A, in addition to a flight configuration during the flight mode, as represented in FIG. 1B. As part of the stowage configuration, the rotor frame 124 has a collapsed configuration, and each rotor 122 has a packaged configuration. As part of the flight configuration, the rotor frame 124 has an expanded configuration, and each rotor 122 has an open configuration.

The flight module 120 is selectively reconfigurable between the stowage configuration and the flight configuration. Specifically, from the stowage configuration, the flight module 120 is subject to deployment or, in other words, reconfiguration to the flight configuration. Similarly, from the flight configuration, the flight module 120 is subject to un-deployment or, in other words, reconfiguration to the stowage configuration. As part of the flight module 120 being reconfigurable between the stowage configuration and the flight configuration, the rotor frame 124 is selectively reconfigurable between the collapsed configuration and the expanded configuration. Specifically, from the collapsed configuration, the rotor frame 124 is subject to expansion or, in other words, reconfiguration to the expanded configuration. Similarly, from the expanded configuration, the rotor frame 124 is subject to collapse or, in other words, reconfiguration to the collapsed configuration. Also as part of the flight module 120 being reconfigurable between the stowage configuration and the flight configuration, each rotor 122 is selectively reconfigurable between its packaged configuration and its open configuration. Specifically, from its packaged configuration, each rotor 122 is subject to opening or, in other words, reconfiguration to its open configuration. Similarly, from its open configuration, each rotor 122 is subject to packaging or, in other words, reconfiguration to its packaged configuration.

As it is deployed, un-deployed and otherwise reconfigured between the stowage configuration and the flight configuration, the flight module 120 occupies a swept volume passing between inboard the body 110 and outboard the body 110. In relation to the flight module 120, the body 110 defines a number of hatch openings 130 that open between the stowage compartment 108 and the exterior 102 across the swept volume of the flight module 120. Relatedly, the body 110 includes a number of hatches 132 corresponding to the hatch openings 130. For instance, with the stowage compartment 108 rear of the passenger compartment 104, at the upright sides, the body 110 defines rear hatch openings 130 and, as part of the upright sides, includes upright rear hatches 132 corresponding to the rear hatch openings 130. The hatches 132 serve as closure panels for the stowage compartment 108. Each hatch 132 is pivotally, slidingly or otherwise connected to the remainder of the body 110 for movement, relative to a corresponding hatch opening 130, between a closed position and an open position. When closed, in its closed position, each hatch 132 is positioned over a corresponding hatch opening 130. When open, in its open position, each hatch 132 is positioned away from the corresponding hatch opening 130, and thereby vacates the swept volume of the flight module 120, which allows the requisite clearance for reconfiguring the flight module 120 between the stowage configuration and the flight configuration.

The body 110 also defines a number of door openings 134 that open between the passenger compartment 104 and the exterior 102. Relatedly, the body 110 includes a number of doors 136 corresponding to the door openings 134. For instance, at the upright sides, the body 110 defines front door openings 134 and, as part of the upright sides, includes upright front doors 136 corresponding to the front door openings 134. The doors 136 serve as closure panels for the passenger compartment 104. Each door 136 is pivotally, slidingly or otherwise connected to the remainder of the body 110 for movement, relative to a corresponding door opening 134, between a closed position and an open position. When closed, in its closed position, each door 136 is positioned over a corresponding door opening 134. When open, in its open position, each door 136 is positioned away from the corresponding door opening 134, which allows ingress into and egress out of the passenger compartment 104.

Figure 1C:
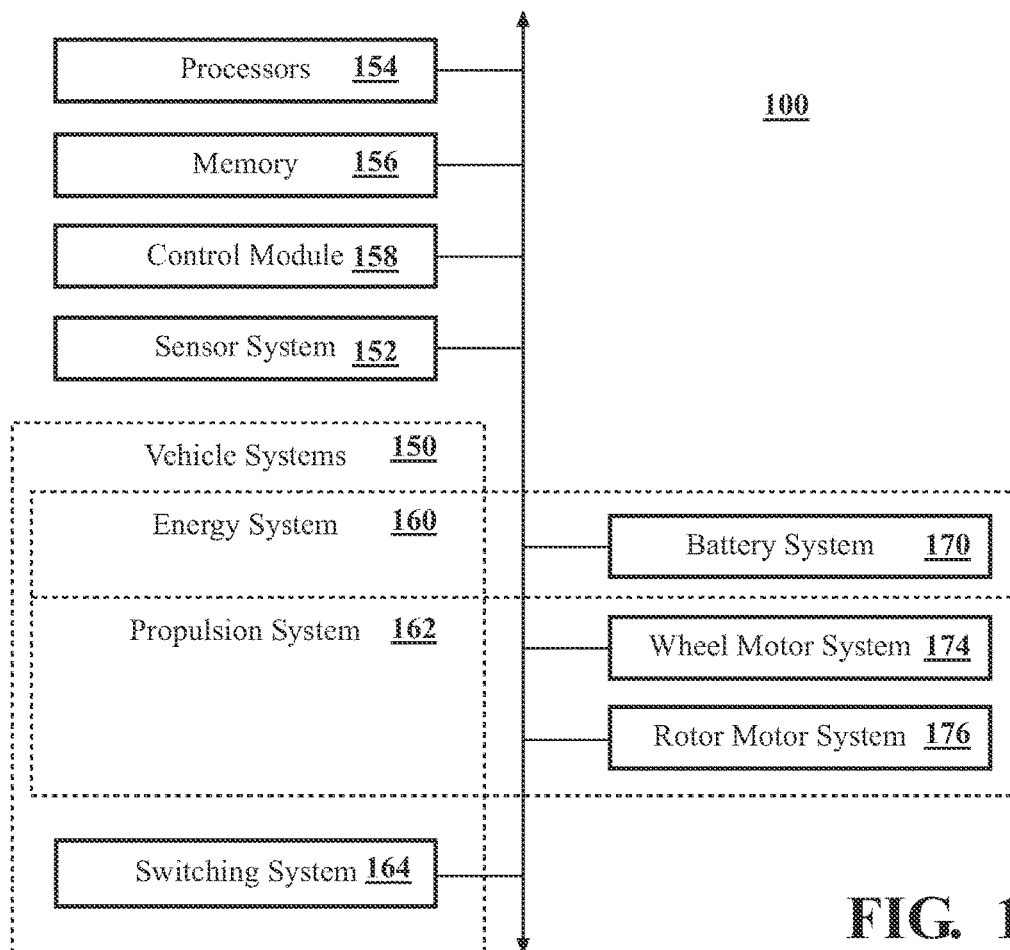
FIGS. 1C and 1D are portrayals of the aerial vehicle using block diagrams, showing vehicle systems and a control module configured to operate the vehicle systems, with the vehicle systems including a propulsion system operable to power the wheels and power the rotors to generate aerodynamic force, and a switching system operable to switch the aerial vehicle between the ground mode and the flight mode, including reconfiguring the flight module between the stowage configuration and the flight configuration.
Figure 1D:
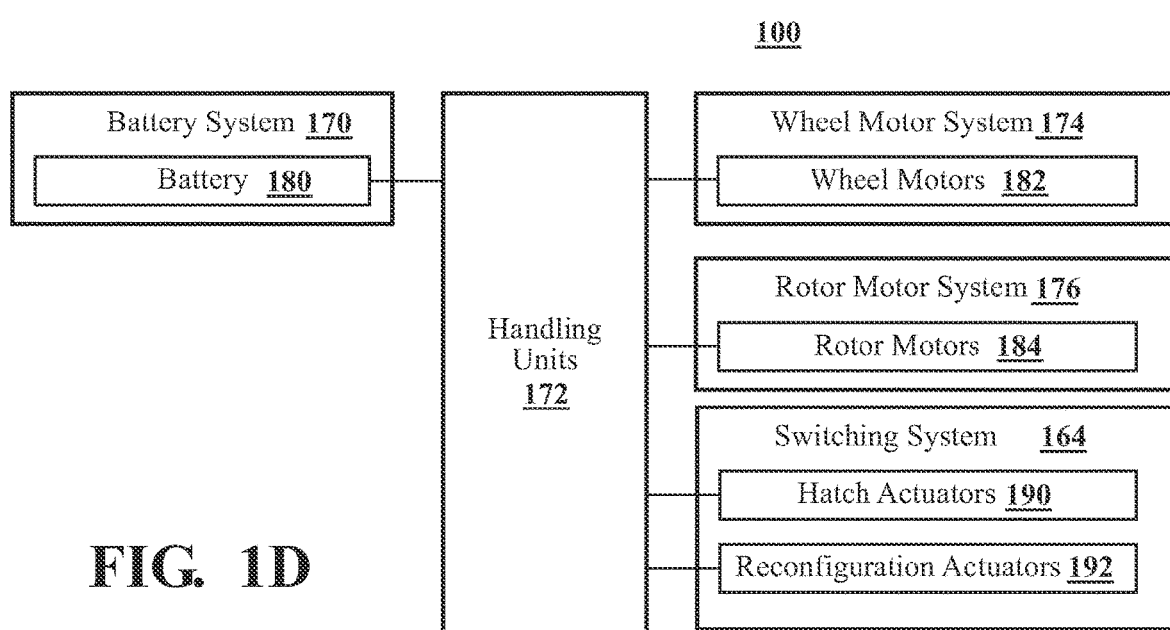

As shown with additional reference to FIGS. 1C and 1D, the aerial vehicle 100 operates as an assembly of interconnected items that equip the aerial vehicle 100 to perform vehicle functions. With respect to performing vehicle functions, the aerial vehicle 100 is subject to any combination of manual operation and autonomous operation. In the case of manual operation, the aerial vehicle 100 may be manual-only. In the case of autonomous operation, the aerial vehicle 100 may be semi-autonomous, highly-autonomous or fully-autonomous.

For purposes of performing vehicle functions, the aerial vehicle 100 includes one or more vehicle systems 150. Either alone or in conjunction with the either the drivetrain or the flight module 120, or both, the vehicle systems 150 are operable to perform vehicle functions on behalf of the aerial vehicle 100. Any combination of the vehicle systems 150 may be operable to perform a vehicle function. Accordingly, from the perspective of a vehicle function, one, some or all of the vehicle systems 150 serve as associated vehicle systems 150. Moreover, each vehicle system 150 may be operable to perform any combination of vehicle functions, in whole or in part. Accordingly, each vehicle system 150, from its own perspective, serves as an associated vehicle system 150 for one or more vehicle functions.

In addition to the vehicle systems 150, the aerial vehicle 100 includes a sensor system 152, as well as one or more processors 154, memory 156, and a control module 158 to which the vehicle systems 150 and the sensor system 152 are communicatively connected. The sensor system 152 is operable to detect information about the aerial vehicle 100. The processors 154, the memory 156 and the control module 158 together serve as a computing device whose control module 158 is employable to orchestrate the operation of the aerial vehicle 100. Specifically, the control module 158 operates the vehicle systems 150 based on information about the aerial vehicle 100. Accordingly, as a prerequisite to operating the vehicle systems 150, the control module 158 gathers information about the aerial vehicle 100, including the information about the aerial vehicle 100 detected by the sensor system 152. The control module 158 then evaluates the information about the aerial vehicle 100, and operates the vehicle systems 150 based on its evaluation.

Flight Module.

As represented in FIG. 1A, during the ground mode, the rotor frame 124, in the collapsed configuration, congregates inboard the body 110, where it serves as a stowage platform for the rotors 122. Each rotor 122 is in its packaged configuration and, with the rotor frame 124 congregated inboard the body 110 and serving as its stowage platform, is tucked inboard the body 110 in a respective stowage position. Relatedly, with the flight module 120 in the stowage configuration, the flight module 120, including the rotor frame 124 and the rotors 122, is compactly housed by the stowage compartment 108.

The stowage compartment 108, as shown, is defined as an individual standalone space dedicated to housing the flight module 120 in the stowage configuration. Alternatively, the stowage compartment 108 could be defined as any combination of one or more individual spaces open to another compartment, such as the passenger compartment 104, and one or more and individual spaces open to housing other items.

With the flight module 120 in the stowage configuration, and housed by the stowage compartment 108, the flight module 120, including but not limited to the flight-critical rotors 122, is protected from damage from the surrounding environment. Moreover, notwithstanding being equipped with the flight module 120, the aerial vehicle 100 is comparably sized and comparably easy to maneuver on the ground as an otherwise similar ground-only vehicle. Relatedly, the aerial vehicle 100 has comparable practicality and driving dynamics on the ground as an otherwise similar ground-only vehicle.

As represented in FIG. 1B, during the flight mode, the rotor frame 124, in the expanded configuration, reaches from the body 110, beyond the stowage compartment 108, to outboard the body 110, where it serves as a flight platform for the rotors 122. Each rotor 122 is in its open configuration and, with the rotor frame 124 reaching outboard the body 110 and serving as its flight platform, is perched outboard the body 110 in a respective flight position. Relatedly, with the flight module 120 in the flight configuration, one, some or all of the rotors 122 are powered to generate aerodynamic force usable to fly the aerial vehicle 100 through the air.

Vehicle Systems.

The vehicle systems 150 are part of, mounted to or otherwise supported by the body 110. The vehicle systems 150 may be housed, in whole or in part, in any combination of the passenger compartment 104, the engine compartment 106, the stowage compartment 108 or elsewhere in the aerial vehicle 100. Each vehicle system 150 includes one or more vehicle elements. On behalf of the vehicle system 150 to which it belongs, each vehicle element is operable to perform, in whole or in part, any combination of vehicle functions with which the vehicle system 150 is associated. It will be understood that the vehicle elements, as well as the vehicle systems 150 to which they belong, may but need not be mutually distinct.

The vehicle systems 150 include an energy system 160 and a propulsion system 162. The propulsion system 162 is connected to the energy system 160. Moreover, the drivetrain is mechanically connected to the propulsion system 162, and each rotor 122 is mechanically connected with the propulsion system 162. The energy system 160 is operable to perform one or more energy functions, including but not limited to storing, conditioning and otherwise handling energy. The propulsion system 162 is operable to perform one or more propulsion functions using energy from the energy system 160, including but not limited to powering the wheels 114 and powering the rotors 122 to generate aerodynamic force. During the ground mode, as the product of powering the wheels 114, the propulsion system 162 is operable to accelerate the aerial vehicle 100, maintain the speed of the aerial vehicle 100 (e.g., on level or uphill ground) and otherwise drive the aerial vehicle 100 along the ground. During the flight mode, as the product of powering the rotors 122 to generate aerodynamic force, the propulsion system 162 is operable to throttle the aerial vehicle 100, lift the aerial vehicle 100, roll the aerial vehicle 100, pitch the aerial vehicle 100, yaw the aerial vehicle 100 and otherwise fly the aerial vehicle 100 through the air using aerodynamic force generated by the rotors 122.

In relation to the flight module 120, in addition to the energy system 160 and the propulsion system 162, the vehicle systems 150 include a switching system 164. The switching system 164 is connected to the energy system 160. Moreover, the switching system 164 is mechanically connected with the hatches 132 and the flight module 120. The switching system 164 is operable to perform one or more switching functions using energy from the energy system 160, including but not limited to opening the hatches 132, closing the hatches 132 and otherwise moving the hatches 132 between their closed positions and their open positions, and deploying the flight module 120, un-deploying the flight module 120 and otherwise reconfiguring the flight module 120 between the stowage configuration and the flight configuration. As the combined product of opening the hatches 132, deploying the flight module 120 and closing the hatches 132, the switching system 164 is operable to switch the aerial vehicle 100 from the ground mode to the flight mode. Similarly, as the combined product of opening the hatches 132, un-deploying the flight module 120 and closing the hatches 132, the switching system 164 is operable to switch the aerial vehicle 100 from the flight mode to the ground mode.

In an electrified implementation, the energy system 160 includes a battery system 170 and one or more handling units 172. In any combination of plug-in, range-extending, hybrid and like arrangements, the energy system 160 may include any combination of one or more chargers operable to condition electrical energy for storage by the battery system 170, as well one or more engines, one or more generators, one or more fuel cells and the like operable to generate electrical energy for storage by the battery system 170. In relation to the battery system 170 and the handling units 172, the propulsion system 162 includes a wheel motor system 174 and a rotor motor system 176.

Among the energy elements of the battery system 170, the aerial vehicle 100 includes a battery 180. Although the aerial vehicle 100, as shown, includes one battery 180 in the battery system 170, it will be understood that this disclosure is applicable in principle to otherwise similar aerial vehicles 100 including multiple batteries 180 in the battery system 170. The battery 180 is operable to store electrical energy. The handling units 172 are operable to condition and otherwise handle electrical energy from the battery 180, including but not limited to distributing electrical energy from the battery 180 and conditioning electrical energy from the battery 180 (e.g., converting DC electrical energy from the battery 180 into three-phase AC electrical energy, converting a certain voltage DC electrical energy from the battery 180 into a different voltage DC electrical energy, etc.).

Among the propulsion elements of the wheel motor system 174, the aerial vehicle 100 includes wheel motors 182. Although the aerial vehicle 100, as shown, includes one wheel motor 182 per front wheel 114 in the wheel motor system 174, it will be understood that this disclosure is applicable in principle to otherwise similar aerial vehicles 100 including one wheel motor 182 per multiple front wheels 114 in the wheel motor system 174. The wheel motors 182 may, for instance, be synchronous three-phase AC or other type of electric motors. The wheel motors 182 are electrically connected to the battery 180 through the handling units 172. Moreover, the drivetrain is mechanically connected to the wheel motors 182. The wheel motors 182 and the drivetrain together serve as an electrified powertrain for the aerial vehicle 100. In conjunction with the drivetrain, the wheel motors 182 are operable to power the wheels 114 using electrical energy from the handling units 172.

Among the propulsion elements of the rotor motor system 176, as part of the rotors 122, the aerial vehicle 100 includes rotor motors 184. Although the aerial vehicle 100, as shown, includes one rotor motor 184 per rotor 122 in the rotor motor system 176, it will be understood that this disclosure is applicable in principle to otherwise similar aerial vehicles 100 including multiple rotor motors 184 per rotor 122 in the rotor motor system 176. Each rotor motor 184 may, for instance, be a brushless DC permanent magnet or other type of electric motor. Each rotor motor 184 is electrically connected to the battery 180 through the handling units 172. Moreover, each rotor 122 is mechanically connected with its rotor motor 184. In conjunction with the rotor 122 to which it belongs, each rotor motor 184 is operable to power the rotor 122 to generate aerodynamic force using electrical energy from the handling units 172.

Among the switching elements of the switching system 164, the aerial vehicle 100 includes hatch actuators 190 corresponding to the hatches 132. Each hatch actuator 190 is electrically connected to the battery 180 through the handling units 172. Moreover, each hatch actuator 190 is mechanically connected with a corresponding hatch 132. The hatch actuators 190 are operable to open the hatches 132, close the hatches 132 and otherwise move the hatches 132 between their closed positions and their open positions using electrical energy from the handling units 172.

Also among the switching elements of the switching system 164, as part of the flight module 120, the aerial vehicle 100 includes reconfiguration actuators 192. Each reconfiguration actuator 192 is electrically connected to the battery 180 through the handling units 172. Moreover, each reconfiguration actuator 192 is mechanically connected with the flight module 120. The reconfiguration actuators 192 are operable to deploy the flight module 120, un-deploy the flight module 120 and otherwise reconfigure the flight module 120 between the stowage configuration and the flight configuration using electrical energy from the handling units 172, including expanding the rotor frame 124, collapsing the rotor frame 124 and otherwise reconfiguring the rotor frame 124 between the collapsed configuration and the expanded configuration, and opening the rotors 122, packaging the rotors 122 and otherwise reconfiguring the rotors 122 between their packaged configurations and their open configurations.

Sensor System.

As part of the sensor system 152, the aerial vehicle 100 includes one or more onboard sensors. The sensors monitor the aerial vehicle 100 in real-time. The sensors, on behalf of the sensor system 152, are operable to detect information about the aerial vehicle 100, including information about the operation of the aerial vehicle 100. Among the sensors, the aerial vehicle 100 includes one or more speedometers, one or more gyroscopes, one or more accelerometers, one or more inertial measurement units (IMUs), one or more wheel sensors, one or more hatch sensors, one or more flight module sensors, one or more controller area network (CAN) sensors and the like. Relatedly, among information about the operation of the aerial vehicle 100, the sensor system 152 is operable to detect the location and motion of the aerial vehicle 100, including its speed, acceleration, orientation, rotation, direction and the like, the movement of the wheels 114, the movement and force feedback of the hatches 132, the movement and force feedback of the flight module 120, including the movement and force feedback of the rotor frame 124 and the movement and force feedback of the rotors 122, and the operational statuses of one, some or all of the vehicle systems 150.

Computing Device.

As noted above, the processors 154, the memory 156 and the control module 158 together serve as a computing device whose control module 158 orchestrates the operation of the aerial vehicle 100, including but not limited to the operation of the vehicle systems 150. The control module 158 may be a global control module. Relatedly, as part of a central control system, the aerial vehicle 100 may include a global control unit to which the control module 158 belongs. Although the aerial vehicle 100, as shown, includes one control module 158, it will be understood that this disclosure is applicable in principle to otherwise similar aerial vehicles 100 including multiple control modules 158.

The processors 154 are any components configured to execute any of the processes described herein or any form of instructions to carry out such processes or cause such processes to be performed. The processors 154 may be implemented with one or more general-purpose or special-purpose processors. Examples of suitable processors 154 include microprocessors, microcontrollers, digital signal processors or other forms of circuitry that execute software. Other examples of suitable processors 154 include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processors 154 may include at least one hardware circuit (e.g., an integrated circuit) configured to carry out instructions contained in program code. In arrangements where there are multiple processors 154, the processors 154 may work independently from each other or in combination with one another.

The memory 156 is a non-transitory computer readable medium. The memory 156 may include volatile or nonvolatile memory, or both. Examples of suitable memory 156 includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory 156 includes stored instructions in program code. Such instructions are executable by the processors 154 or the control module 158. The memory 156 may be part of the processors 154 or the control module 158, or may be communicatively connected the processors 154 or the control module 158.

Generally speaking, the control module 158 includes instructions that may be executed by the processors 154. The control module 158 may be implemented as computer readable program code that, when executed by the processors 154, execute one or more of the processes described herein. Such computer readable program code may be stored on the memory 156. The control module 158 may be part of the processors 154, or may be communicatively connected the processors 154.

Switching the Aerial Vehicle Between the Ground Mode and the Flight Mode

The operations of a process for switching the aerial vehicle 100 between the ground mode and the flight mode are represented in FIGS. 2A-2G. The description of the process follows with reference to the forward progression of FIGS. 2A-2G, in which the aerial vehicle 100 is shown being switched from the ground mode to the flight mode. However, it will be understood that this disclosure, with reference to the reverse progression of FIGS. 2A-2G, is applicable in principle to the aerial vehicle 100 being switched from the flight mode to the ground mode.

Figure 2A:
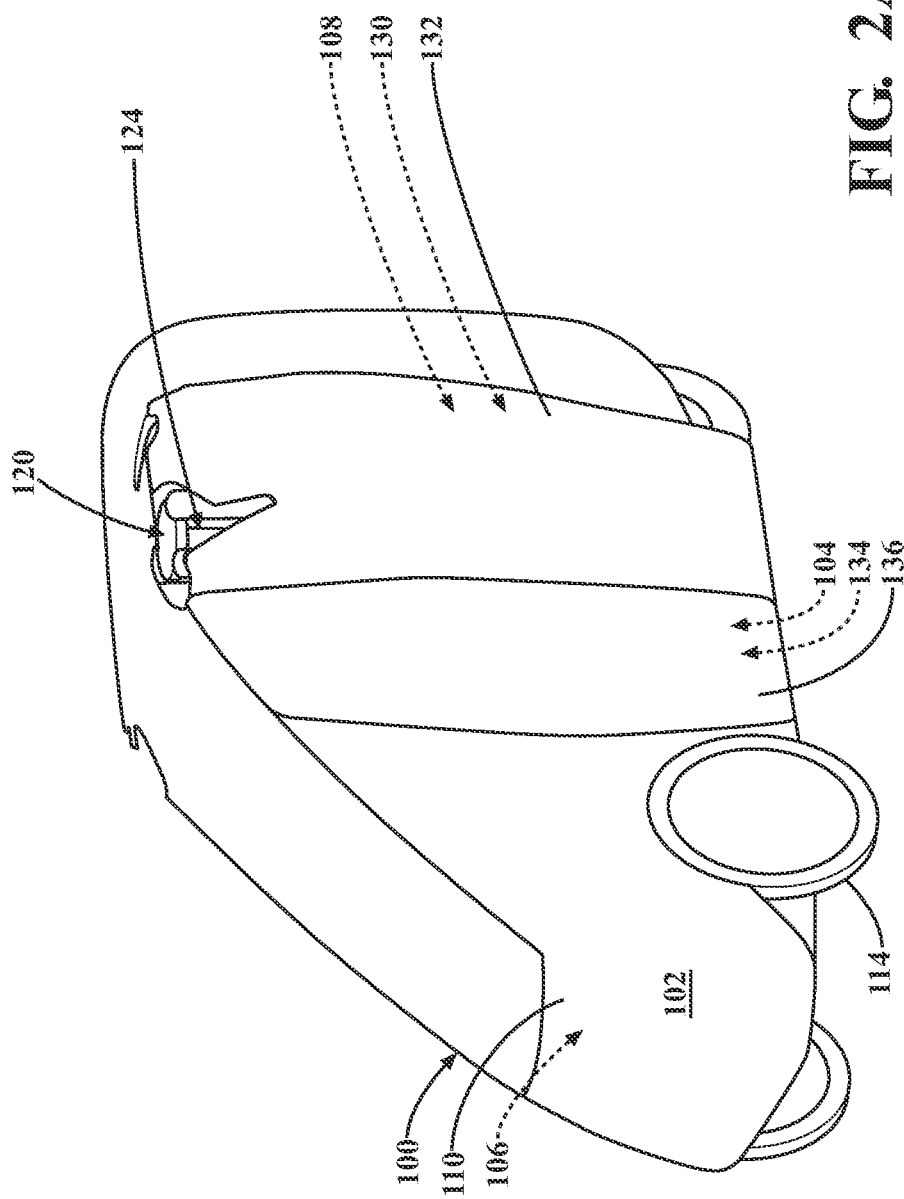
Figure 2A:
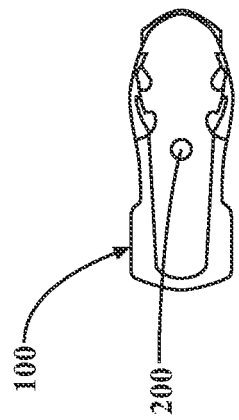

As shown in FIG. 2A, during the ground mode, the flight module 120 is in the stowage configuration, and housed by the stowage compartment 108. Moreover, with the flight module 120 housed by the stowage compartment 108, each hatch 132 is in its closed position. As part of the stowage configuration, the rotor frame 124 has the collapsed configuration, and each rotor 122 has its packaged configuration. In the collapsed configuration, the rotor frame 124 retentively carries the rotors 122 in their stowage positions. Each rotor 122, in its stowage position, has an outboard-facing orientation, and is located inboard the body 110. For instance, each rotor 122, in its stowage position, is located in any combination of the vertical, longitudinal and lateral footprint of the body 110. Together, in their stowage positions, the rotors 122 are circumferentially-spaced from one another about the rotor frame 124.

As part of the process, the control module 158 gathers information about the aerial vehicle 100 for evaluation, including information about the aerial vehicle 100 detected by the sensor system 152. As part of its evaluation of the information about the aerial vehicle 100, the control module 158 monitors for a switch signal that indicates a switch from the ground mode to the flight mode. When the control module 158 does not identify a switch signal, it continues to monitor for a switch signal in anticipation that a switch signal will materialize. Otherwise, when it identifies a switch signal, the control module 158 operates the switching system 164 to switch the aerial vehicle 100 from the ground mode to the flight mode.

Figure 2B:
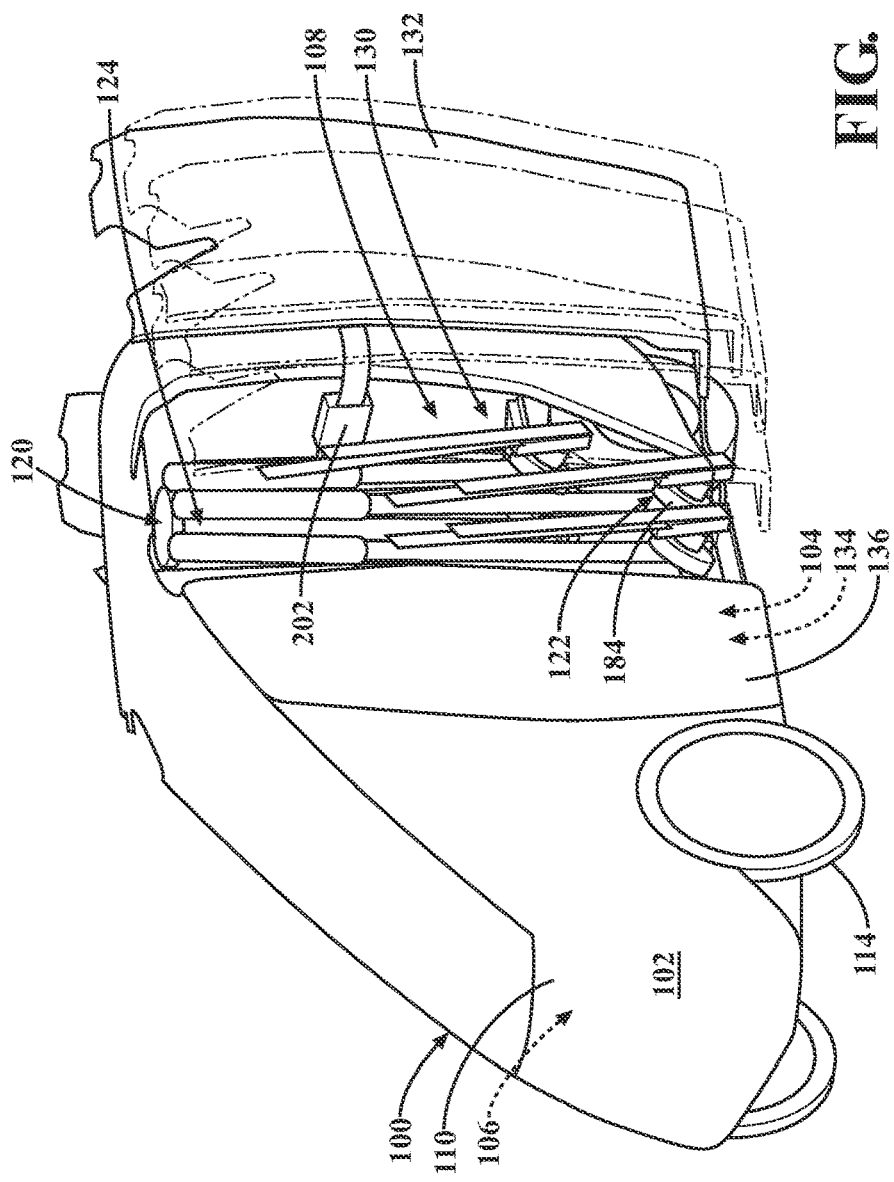
Figure 2B:
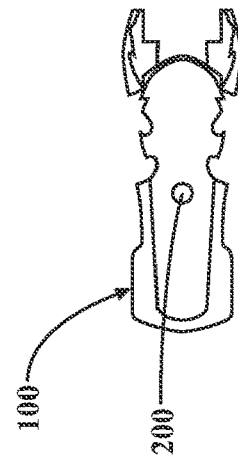
Figure 2D:
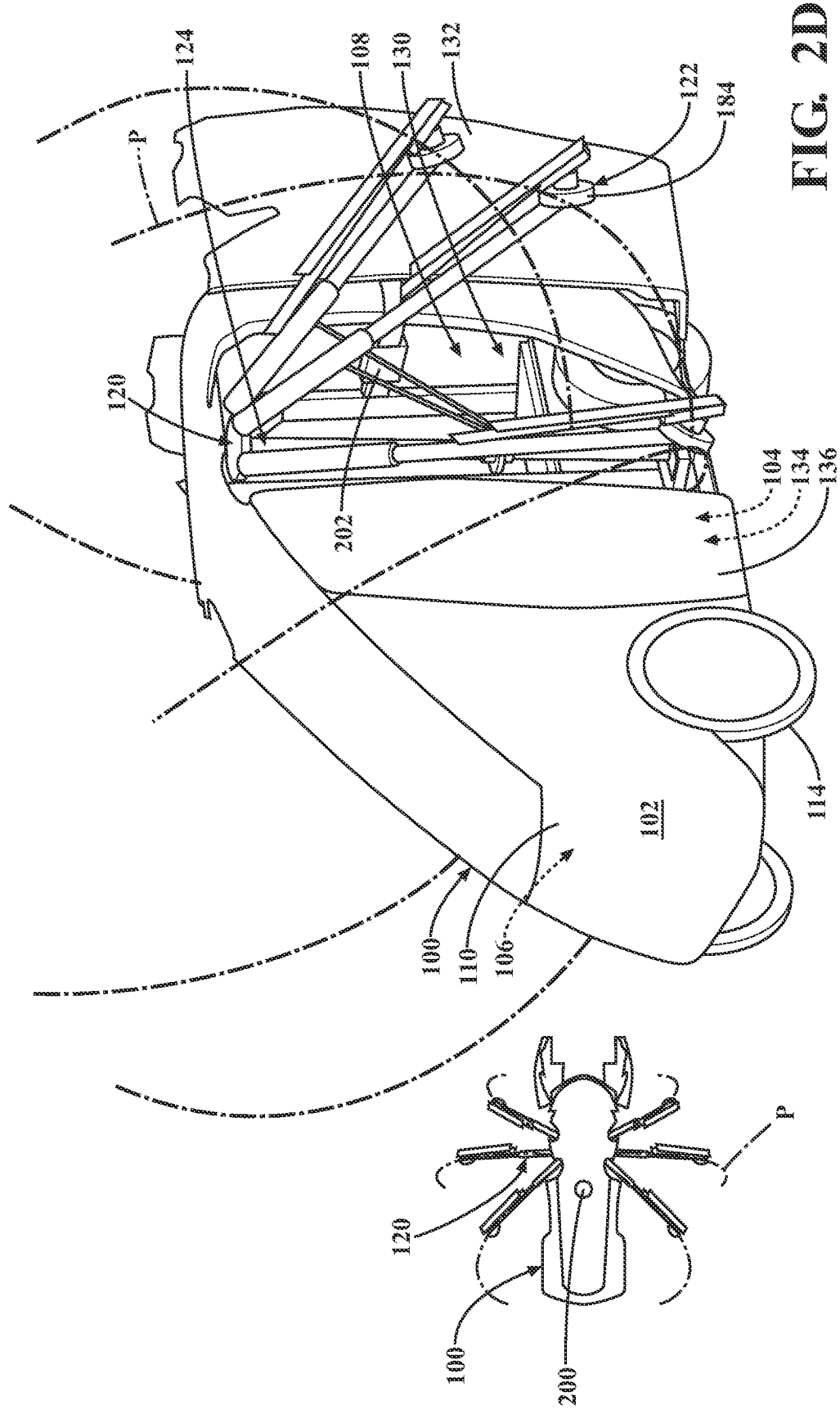
Figure 2E:
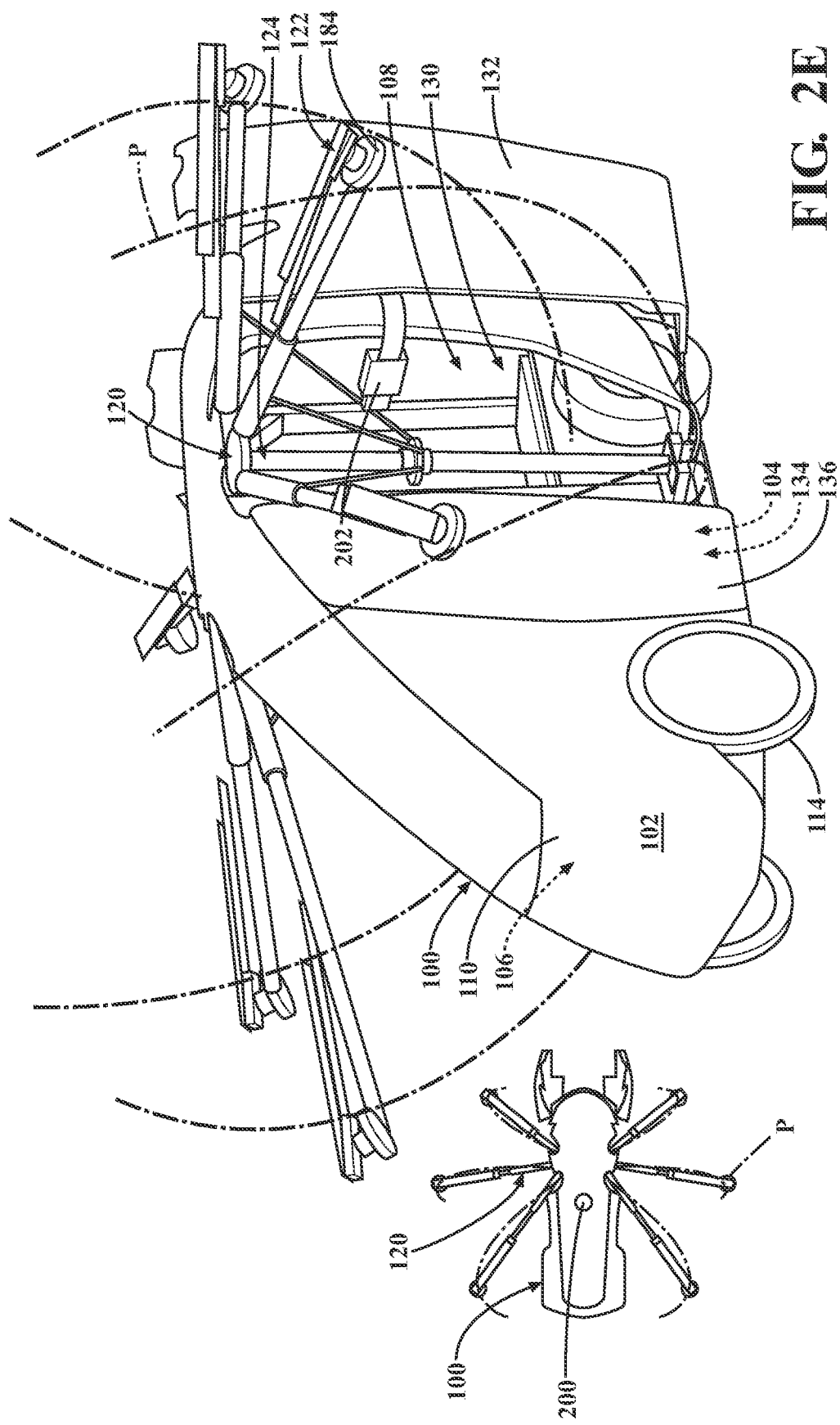
Figure 2F:
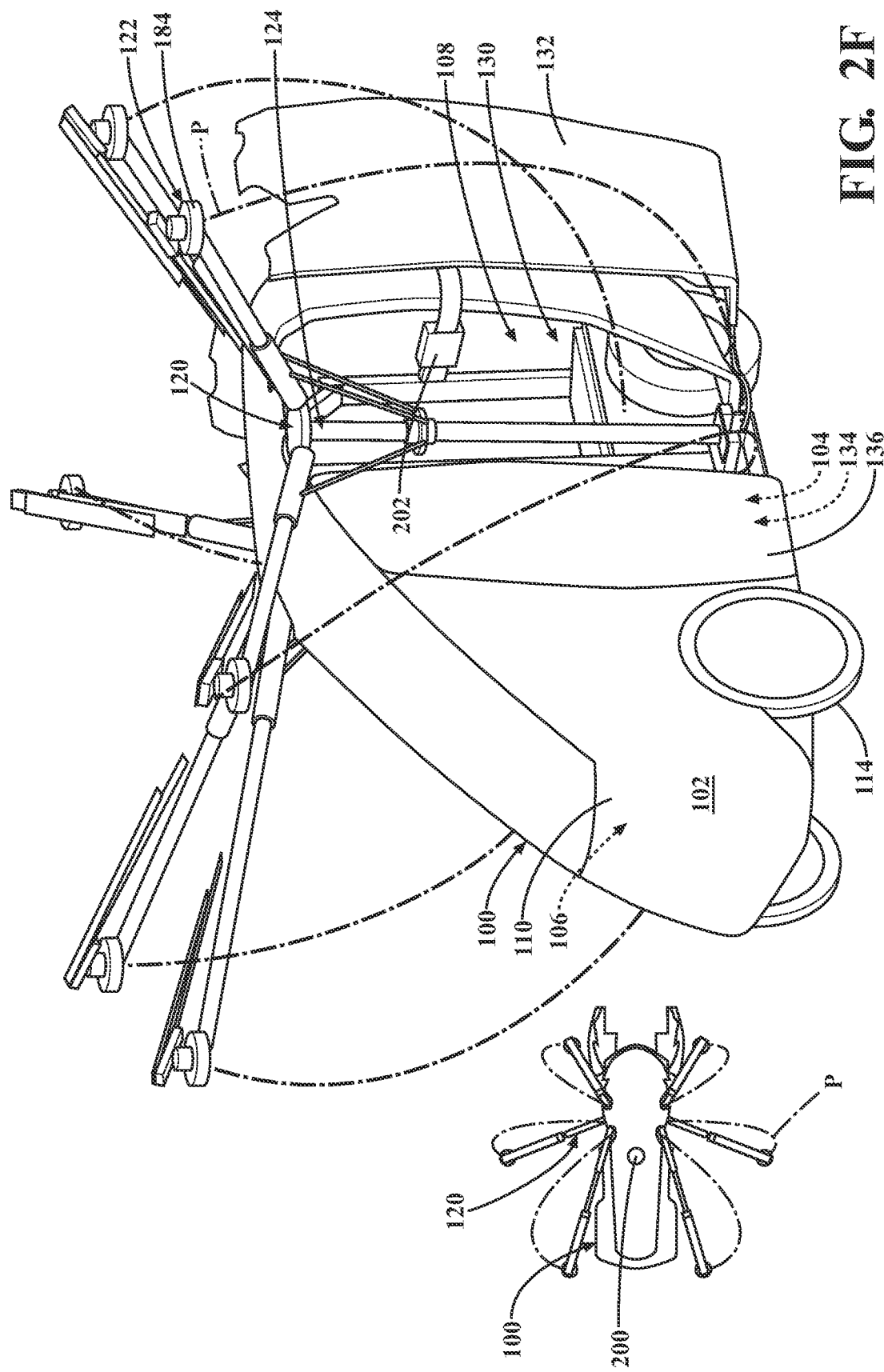
Figure 2G:
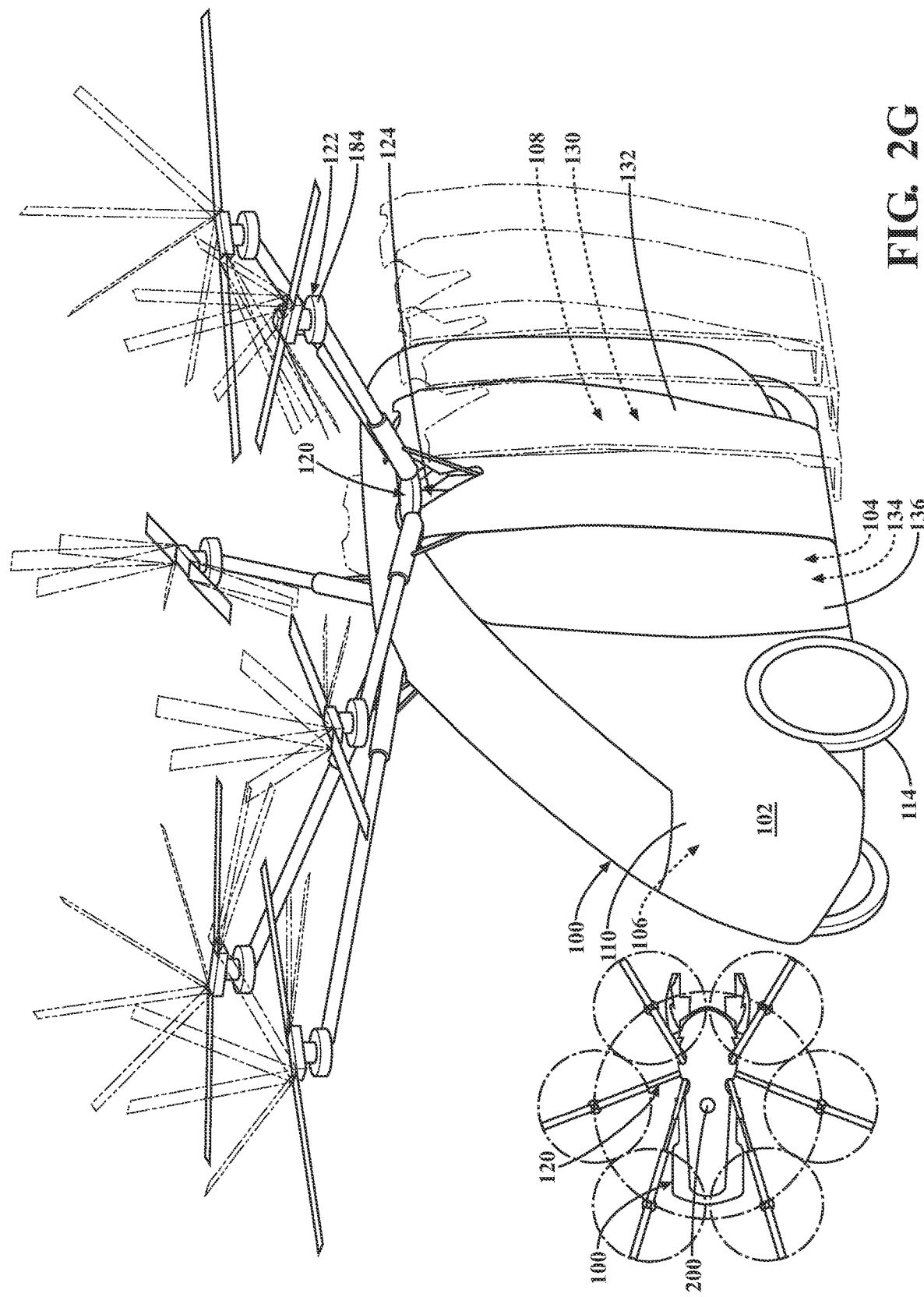

Specifically, as shown in FIG. 2B, in association with the commencement of deploying the flight module 120, the control module 158 operates the hatch actuators 190 to open the hatches 132. The hatches 132 could be opened either ahead of or during, or both, the commencement of deploying the flight module 120. For instance, the hatches 132, as shown, are opened ahead of the commencement of deploying the flight module 120. As shown in FIGS. 2C-2G, with the hatches 132 thereby vacating the swept volume of the flight module 120, the control module 158 operates the reconfiguration actuators 192 to deploy the flight module 120. As shown in FIG. 2G, in association with the culmination of deploying the flight module 120, the control module 158 operates the hatch actuators 190 to close the hatches 132. The hatches 132 could be closed either during or following, or both, the culmination of deploying the flight module 120. For instance, the hatches 132, as shown, are closed during the culmination of deploying the flight module 120.

As part of deploying the flight module 120, the control module 158 operates the reconfiguration actuators 192 to expand the rotor frame 124. With its expansion, the rotor frame 124 carries the rotors 122 along respective paths P from their stowage positions to their flight positions. Also as part of deploying the flight module 120, in association with expanding the rotor frame 124, the control module 158 operates the reconfiguration actuators 192 to open the rotors 122. The rotors 122 could be opened any combination of ahead of, during and following expanding the rotor frame 124. For instance, the rotors 122, as shown, are opened following expanding the rotor frame 124.

As a further part of its evaluation of the information about the aerial vehicle 100, the control module 158 may monitor any combination of the movement and force feedback of the hatches 132 and the movement and force feedback of the flight module 120, including the movement and force feedback of the rotor frame 124 and the movement and force feedback of the rotors 122. Relatedly, based on its evaluation of the information about the aerial vehicle 100, and by the operation of the hatch actuators 190 and the reconfiguration actuators 192, as the case may be, the control module 158 may coordinate any combination of opening the hatches 132, deploying the flight module 120, including expanding the rotor frame 124 and opening the rotors 122, and closing the hatches 132 to ensure anti-collision, and anti jamming and otherwise correct operation of the switching system 164.

During the flight mode, the flight module 120 is in the flight configuration, and deployed beyond the stowage compartment 108. As part of the flight configuration, the rotor frame 124 has the expanded configuration, and each rotor 122 has its open configuration. In the expanded configuration, the rotor frame 124 retentively carries the rotors 122 in their flight positions. Each rotor 122, in its flight position, has a skyward-facing orientation, and is perched overhead the body 110, beyond its vertical footprint, or otherwise outboard the body 110. Together, in their flight positions, the rotors 122 are circumferentially-spaced from one another about a center of mass 200 of the aerial vehicle 100.

Although the aerial vehicle 100, as shown, includes six rotors 122 in the flight module 120, it will be understood that this disclosure is applicable in principle to otherwise similar aerial vehicles 100 including multiple rotors 122 in the flight module 120. With the flight module 120 including six rotors 122, the outboard-and-overhead-perched, skyward-facing, circumferentially-spaced arrangement of the rotors 122 in their flight positions is typical of hexa-copters. In otherwise similar multicopter arrangements, the aerial vehicle 100 could include three rotors 122, four rotors 122, five rotors 122, etc. in the flight module 120.

During the flight mode, with the flight module 120 in the flight configuration, the control module 158 operates the rotor motors 184, or otherwise operates the propulsion system 162, to power the rotors 122 to generate aerodynamic force. With the rotors 122 powered to generate aerodynamic force, the aerial vehicle 100 flies through the air using aerodynamic force generated by the rotors 122, including but not limited to any combination of aerodynamic lift generated by the rotors 122, aerodynamic thrust generated by the rotors 122 and aerodynamic torque generated by the rotors 122. In relation to the aerial vehicle 100 flying through the air using aerodynamic force generated by the rotors 122, each rotor 122, although having a skyward-facing orientation in its flight position, need not be perfectly vertically oriented. Instead, for each rotor 122, the notion of its flight position is inclusive of the perfectly vertical orientation, as well as any combination of fixed and varying off-vertical orientations.

Among other things, the aerial vehicle 100 is equipped for vertical takeoff and landing (VTOL) using aerodynamic lift generated by the rotors 122. Specifically, to initiate flying through the air from on the ground, aerodynamic lift generated by the rotors 122 is used to overcome the weight of the aerial vehicle 100. The aerial vehicle 100 then vertically takes off from the ground. From in the air, to end flying through the air, aerodynamic lift generated by the rotors 122 is used to counteract but not overcome the weight of the aerial vehicle 100. The aerial vehicle 100 then vertically lands back onto the ground.

Rotor Frame

Figure 3A:
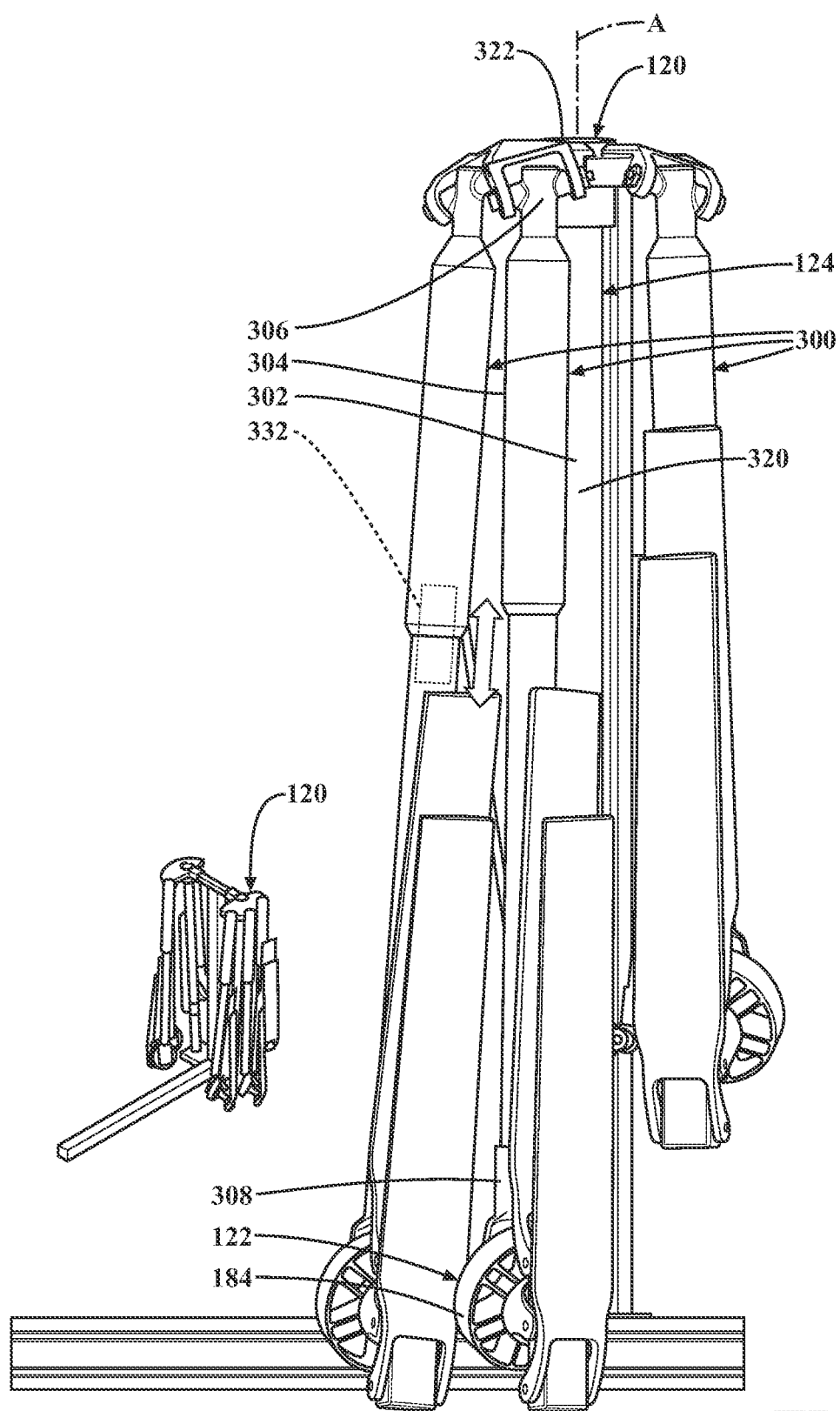
FIGS. 3A and 3B are portrayals of the flight module in isolation from the aerial vehicle using corresponding partial side views and perspective views, further showing aspects of the rotor frame, including rotor arms carrying the rotors, with the rotor arms congregating inboard the body in the collapsed configuration, where they retentively carry the rotors in stowage positions, as represented in FIG. 3A, and reaching to outboard the body in the expanded configuration, where they retentively carry the rotors in flight positions, as represented in FIG. 3B.
Figure 3B:
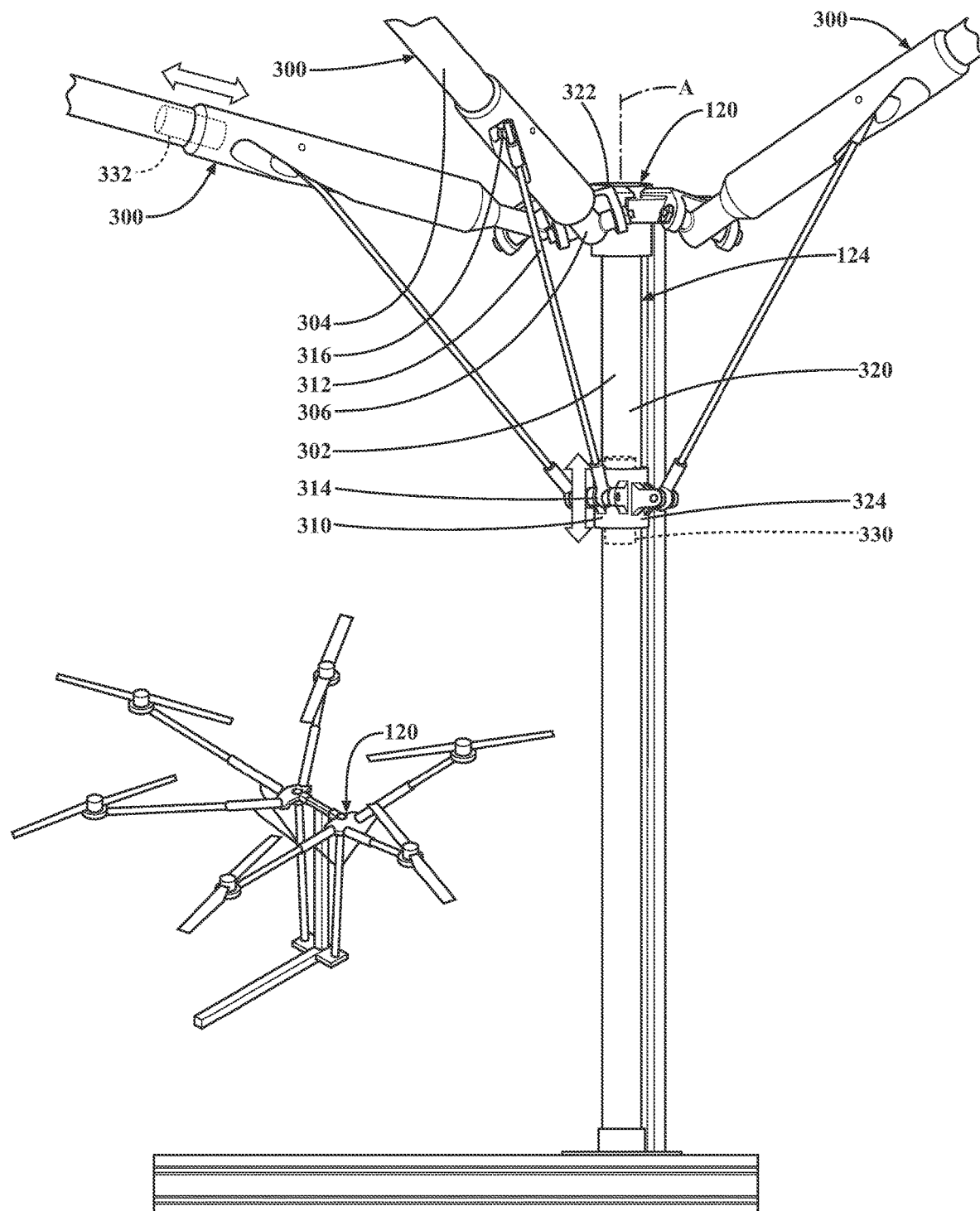

As shown with additional reference to FIGS. 3A and 3B, the rotor frame 124 is upstanding, and has a vertical or otherwise upright rotor frame axis A located inboard the body 110. The rotor frame 124 includes elongate, rotor-bearing rotor carriers 300. In relation to the aerial vehicle 100, the rotor carriers 300 are mounted to the body 110 in the stowage compartment 108. The rotor carriers 300 extend from the body 110 relative to the rotor frame axis A, and each rotor 122 is mounted to a rotor carrier 300. With the rotor carriers 300 thus mounted between the body 110 and the rotors 122, the rotor carriers 300 carry the rotors 122 relative to the body 110.

As the rotor frame 124 is expanded, collapsed and otherwise reconfigured between the collapsed configuration and the expanded configuration, the rotor carriers 300 carry the rotors 122 along their paths P between their stowage positions and their flight positions. For purposes of reconfiguring the rotor frame 124 between the collapsed configuration and the expanded configuration, and the rotor carriers 300 carrying the rotors 122 along their paths P between their stowage positions and their flight positions, each rotor carrier 300 is rendered by a series of elongate, inter-hinged segments.

As identified for a representative rotor carrier 300, each rotor carrier 300 includes an elongate, upstanding carriage rail 302 located inboard the body 110, and an elongate rotor arm 304 atop the carriage rail 302. The carriage rail 302 is bracket mounted to the body 110, and extends upward along the rotor frame axis A. At the culmination of the carriage rail 302, the rotor arm 304 is mounted to the carriage rail 302 with a rotor arm mount 306, and extends from the carriage rail 302 relative to the rotor frame axis A. The rotor arm mount 306 is rendered by a hinge. With the rotor arm mount 306 rendered by a hinge, the rotor arm 304 is pivotally mounted to the carriage rail 302 by the rotor arm mount 306, and supported atop the carriage rail 302 for pivotation relative to the carriage rail 302. The rotor arm mount 306, as shown, is rendered by a clevis-style or knuckle-style hinge that serves as a revolute joint defining a single rotational degree of freedom.

At the culmination of the rotor arm 304, a rotor 122 is mounted to the rotor arm 304 with a rotor mount 308. With the rotor 122 mounted to the rotor arm 304, the rotor arm 304 carries the rotor 122. Although the aerial vehicle 100, as shown, includes one rotor 122 mounted to the rotor arm 304, it will be understood that this disclosure is applicable in principle to otherwise similar aerial vehicles 100 including multiple rotors 122 mounted to the rotor arm 304.

From atop the carriage rail 302, in the collapsed configuration, the rotor arm 304 extends from the carriage rail 302 along the rotor frame axis A, as shown in FIG. 3A. The rotor arm 304 is thus inboard the body 110 alongside the carriage rail 302, where it retentively carries the rotor 122 in its stowage position, and congregates with the rotor arms 304 of the remaining rotor carriers 300. In the expanded configuration, the rotor arm 304 extends from the carriage rail 302 away from the rotor frame axis A, as shown in FIG. 3B. From the body 110, the rotor arm 304 thus reaches to outboard the body 110 to overhanging the carriage rail 302, where it retentively carries the rotor 122 in its flight position. Relatedly, as part of expanding the rotor frame 124, the rotor arm 304, from alongside the carriage rail 302, is pivoted to overhanging the carriage rail 302. The rotor arm 304 thus carries the rotor 122 along its path P from its stowage position to its flight position. As part of collapsing the rotor frame 124, the rotor arm 304, from overhanging the carriage rail 302, is pivoted to alongside the carriage rail 302. The rotor arm 304 thus carries the rotor 122 along its path P from its flight position to its stowage position.

By defining a single rotational degree of freedom, the rotor arm mount 306 imparts positional accuracy to pivotation of the rotor arm 304 between alongside the carriage rail 302 and overhanging the carriage rail 302. Relatedly, in the expanded configuration, the rotor arm mount 306 imparts positional accuracy to the rotor arm 304 overhanging the carriage rail 302 and, by extension, to the rotor 122 carried by the rotor arm 304 in its flight position. During the flight mode, the control module 158 leverages the positional accuracy of the rotors 122 in their flight positions for robust individual and coordinated operation of the rotor motors 184 to power the rotors 122 to generate aerodynamic force, and to throttle the aerial vehicle 100, lift the aerial vehicle 100, roll the aerial vehicle 100, pitch the aerial vehicle 100, yaw the aerial vehicle 100 and otherwise fly the aerial vehicle 100 through the air using aerodynamic force generated by the rotors 122.

Moreover, the rotor arm mount 306 directs pivotation of the rotor arm 304 between alongside the carriage rail 302 and overhanging the carriage rail 302. In relation to the aerial vehicle 100, together with that of the rotor arms 304 of the remaining rotor carriers 300, pivotation of the rotor arm 304 between alongside the carriage rail 302 and overhanging the carriage rail 302 is a principal component of the swept volume of the flight module 120.

The rotor arm 304 has a reference sweep plane through the three coplanar points of the rotor arm mount 306, where the rotor arm 304 is supported for pivotation, the rotor 122 in its stowage position and the rotor 122 in its flight position. Relatedly, with pivotation of the rotor arm 304 between alongside the carriage rail 302 and overhanging the carriage rail 302, the rotor arm 304 departs from and lands in the reference sweep plane alongside the carriage rail 302 and overhanging the carriage rail 302. In a planar sweeping arrangement, in addition to departing from and landing in the reference sweep plane alongside the carriage rail 302 and overhanging the carriage rail 302, the rotor arm 304 could sweep through the reference sweep plane. Alternatively, as shown, in a non-planar sweeping arrangement, although departing from and landing in the reference sweep plane alongside the carriage rail 302 and overhanging the carriage rail 302, the rotor arm 304 does not otherwise sweep through the reference sweep plane. Instead, under the direction of the rotor arm mount 306, pivotation of the rotor arm 304 between alongside the carriage rail 302 and overhanging the carriage rail 302 is biased for departure away from the reference sweep plane and landing toward the reference sweep plane.

Specifically, with particular reference to the forward progression of FIGS. 2B-2F, from alongside the carriage rail 302, pivotation of the rotor arm 304 to overhanging the carriage rail 302 is biased for outboard departure or, in other words, departure outboard the body 110, away from the reference sweep plane, and for overhead landing or, in other words, landing overhead the body 110, toward the reference sweep plane. Equally, with particular reference to the reverse progression of FIGS. 2B-2F, from overhanging the carriage rail 302, pivotation of the rotor arm 304 to alongside the carriage rail 302 is biased for overhead departure or, in other words, departure overhead the body 110, away from the reference sweep plane, and for inboard landing or, in other words, landing inboard the body 110, toward the reference sweep plane.

With pivotation of the rotor arms 304 from alongside the carriage rail 302 to overhanging the carriage rail 302 biased for outboard departure away from their reference sweep planes, and with pivotation of the rotor arms 304 from overhanging the carriage rail 302 to alongside the carriage rail 302 biased for inboard landing toward their reference sweep planes, the swept volume of the flight module 120 across which the body 110 defines the hatch openings 130 is minimized. Relatedly, the size of the hatch openings 130, as well as the size of the hatches 132, are minimized.

For purposes of such pivotation of the rotor arm 304 under the direction of the rotor arm mount 306 notwithstanding the rotor arm mount 306 defining a single rotational degree of freedom, the rotor arm 304, although pivotally mounted by the rotor arm mount 306, is non-perpendicular to the rotor arm mount 306. As a product of the rotor arm 304 being non-perpendicular to the rotor arm mount 306, with pivotation of the rotor arm 304 between alongside the carriage rail 302 and overhanging the carriage rail 302, the rotor arm 304 sweeps through a conical surface.

For purposes of pivoting the rotor arm 304 between alongside the carriage rail 302 and overhanging the carriage rail 302, the rotor carrier 300 includes a carriage 310 on the carriage rail 302, and an elongate strut 312 mounted between the carriage 310 and the rotor arm 304. The carriage 310 is supported for sliding or other movement along the carriage rail 302. The strut 312 is mounted to the carriage 310 with a carriage-side strut mount 314, and to the rotor arm 304 with a rotor-arm-side strut mount 316. The carriage-side strut mount 314 and the rotor-arm-side strut mount 316 are each rendered by a hinge. With the carriage-side strut mount 314 and the rotor-arm-side strut mount 316 each rendered by a hinge, the strut 312 is pivotally mounted between the carriage 310 and the rotor arm 304. Relatedly, the strut 312 transfers loading between the carriage 310 and the rotor arm 304 through the carriage-side strut mount 314 and the rotor-arm-side strut mount 316. The carriage-side strut mount 314 and the rotor-arm-side strut mount 316 are each, as shown, rendered by a ball-end-style hinge that serves as a ball joint defining one or more rotational degrees of freedom beyond that through the reference sweep plane of the rotor arm 304, which allows the rotor arm 304 the requisite freedom for pivotation between alongside the carriage rail 302 and overhanging the carriage rail 302 biased for departure away from the reference sweep plane and landing toward the reference sweep plane.

In relation to the carriage 310 and the strut 312, the rotor carrier 300 operates as a mechanically straightforward single-input linkage, with the carriage 310 serving as the input, for dictating all kinematic movement, including pivoting the rotor arm 304 between alongside the carriage rail 302 and overhanging the carriage rail 302, via movement of the carriage 310 along the carriage rail 302. With the rotor arm 304 alongside the carriage rail 302 in the collapsed configuration, with upward movement of the carriage 310 along the carriage rail 302 toward the rotor arm mount 306, the strut 312 transfers loading used to overcome the weight of the rotor arm 304 and the rotor 122 from the carriage 310 to the rotor arm 304. With the strut 312 transferring such loading from the carriage 310 to the rotor arm 304, the rotor arm 304 is pivoted to overhanging the carriage rail 302. With the rotor arm 304 overhanging the carriage rail 302 in the expanded configuration, with downward movement of the carriage 310 along the carriage rail 302 away from the rotor arm mount 306, the strut 312 transfers loading used to counteract but not overcome the weight of the rotor arm 304 and the rotor 122 from the carriage 310 to the rotor arm 304. With the strut 312 transferring such loading from the carriage 310 to the rotor arm 304, the rotor arm 304 is pivoted to alongside the carriage rail 302.

During the flight mode, with the rotor arm 304 overhanging the carriage rail 302 in the expanded configuration, with the carriage 310 retentively held along the carriage rail 302, the strut 312, in a truss-like arrangement, also transfers loading from aerodynamic force generated by the rotor 122 from the rotor arm 304 to the body 110 through the carriage 310 and the carriage rail 302. With the strut 312 transferring such loading from the rotor arm 304 to the body 110 through the carriage 310 and the carriage rail 302, loading otherwise elsewhere on the rotor carrier 300, including but not limited to the rotor arm mount 306, is relieved.

As noted above, the aerial vehicle 100 includes multiple rotors 122 in the flight module 120. Relatedly, as part of the flight module 120, the aerial vehicle 100 includes multiple rotor carriers 300 in the rotor frame 124. Although it will be understood that this disclosure is applicable in principle to otherwise similar aerial vehicles 100 including mutually distinct rotor carriers 300 in the rotor frame 124, the aerial vehicle 100, as shown, includes one or more sets of rotor carriers 300 in the rotor frame 124. For instance, with the flight module 120 including six rotors 122, and with the rotor frame 124 including six rotor carriers 300 carrying the six rotors 122, the rotor frame 124 includes two sets of three rotor carriers 300 each carrying three rotors 122.

Specifically, in relation to the aerial vehicle 100, the six rotor carriers 300 include two rear rotor carriers 300 carrying two rear rotors 122, two side rotor carriers 300 carrying two side rotors 122, and two forward rotor carriers 300 carrying two forward rotors 122. One rear rotor carrier 300, one side rotor carrier 300 and one forward rotor carrier 300 are located at the driver's side of the aerial vehicle 100, where they each face a driver's side hatch opening 130. The other rear rotor carrier 300, the other side rotor carrier 300 and the other forward rotor carrier 300 are located at the other, passenger side of the aerial vehicle 100, where they each face a passenger side hatch opening 130.

Relatedly, the sets of rotor carriers 300 include a driver's side set of rotor carriers 300 and a passenger side set of rotor carriers 300. The driver's side set of rotor carriers 300 is located at the driver's side of the aerial vehicle 100 facing the driver's side hatch opening 130, and includes the rear rotor carrier 300, the side rotor carrier 300 and the forward rotor carrier 300 located at the driver's side of the aerial vehicle 100. The passenger side set of rotor carriers 300 is located at the passenger side of the aerial vehicle 100 facing the passenger side hatch opening 130, and includes the rear rotor carrier 300, the side rotor carrier 300 and the forward rotor carrier 300 located at the passenger side of the aerial vehicle 100.

From the perspective of the rotor carriers 300, each set of rotor carriers 300 may include one or more shared items, including but not limited to one or more shared interoperable items, as well as one or more dedicated items. For instance, as identified for a representative set of rotor carriers 300, each set of rotor carriers 300 includes an elongate, upstanding stand 320 serving as shared carriage rail 302 for the rotor carriers 300. The stand 320 is bracket mounted to the body 110, and extends upward along the rotor frame axis A. In addition to the carriage rail 302, the set of rotor carriers 300 includes a dedicated rotor arm 304 per rotor carrier 300 atop the carriage rail 302.

At the culmination of the carriage rail 302, the rotor arms 304 are mounted to the carriage rail 302 with a dedicated rotor arm mount 306 per rotor arm 304. In relation to the rotor arm mounts 306, the set of rotor carriers 300 includes a shared rotor arm mounting block 322 at the culmination of the carriage rail 302 that includes the rotor arm mounts 306 as a unitary structure. For purposes of pivoting the rotor arms 304 between alongside the carriage rail 302 and overhanging the carriage rail 302, the rotor carrier 300 includes a shared carriage 310 for the rotor carriers 300 on the carriage rail 302, and a dedicated strut 312 per rotor carrier 300 mounted between the carriage 310 and the rotor arms 304. The struts 312 are mounted to the carriage 310 with a dedicated carriage-side strut mount 314 per strut 312, and to the rotor arms 304 with a dedicated rotor-arm-side strut mount 316 per strut 312. In relation to the carriage-side strut mounts 314, the set of rotor carriers 300 includes a shared carriage-side strut mounting block 324 on the carriage 310 that includes the carriage-side strut mounts 314 as a unitary structure.

In relation to the carriage 310 and the struts 312, the set of rotor carriers 300 operates as a mechanically straightforward single-input linkage, with the carriage 310 serving as the input, for dictating all kinematic movement, including pivoting the rotor arms 304 between alongside the carriage rail 302 and overhanging the carriage rail 302, via movement of the carriage 310 along the carriage rail 302. With the rotor arms 304 alongside the carriage rail 302 in the collapsed configuration, with upward movement of the carriage 310 along the carriage rail 302 toward the rotor arm mounts 306, the struts 312 transfer loading used to overcome the weight of the rotor arms 304 and the rotors 122 from the carriage 310 to the rotor arms 304. With the struts 312 transferring such loading from the carriage 310 to the rotor arms 304, the rotor arms 304 are pivoted to overhanging the carriage rail 302. With the rotor arms 304 overhanging the carriage rail 302 in the expanded configuration, with downward movement of the carriage 310 along the carriage rail 302 away from the rotor arm mounts 306, the struts 312 transfer loading used to counteract but not overcome the weight of the rotor arms 304 and the rotors 122 from the carriage 310 to the rotor arms 304. With the struts 312 transferring such loading from the carriage 310 to the rotor arms 304, the rotor arms 304 are pivoted to alongside the carriage rail 302.

During the flight mode, with the rotor arms 304 overhanging the carriage rail 302 in the expanded configuration, with the carriage 310 retentively held along the carriage rail 302, the struts 312, in a truss-like arrangement, also transfer loading from aerodynamic force generated by the rotors 122 from the rotor arms 304 to the carriage 310. With the struts 312 transferring such loading from the rotor arms 304 to the carriage 310, loading otherwise elsewhere on the set of rotor carriers 300, including but not limited to the rotor arm mounts 306, is relieved.

With the stowage compartment 108 rear of the passenger compartment 104, the rotor carriers 300 are mounted to the body 110 rear of the passenger compartment 104, and rearwardly offset from the center of mass 200 of the aerial vehicle 100. From atop the carriage rails 302, in the expanded configuration, together, the rotor arms 304, reaching to outboard the body 110, branch from one another about the rotor frame axis A to carry the rotors 122 in their flight positions. As noted above, in their flight positions, the rotors 122 are circumferentially-spaced from one another about the center of mass 200 of the aerial vehicle 100, as opposed to the rotor frame axis A.

Among other things, it follows that, in each set of rotor carriers 300, a rear rotor arm 304 in the rear rotor carrier 300, a side rotor arm 304 in the side rotor carrier 300 and a forward rotor arm 304 in the forward rotor carrier 300 reach to outboard the body 110 to different extents. Specifically, as shown, the forward rotor arm 304 reaches to outboard the body 110 to a greater extent than both the rear rotor arm 304 and the side rotor arm 304, and the side rotor arm 304 reaches to outboard the body 110 to a greater extent than the rear rotor arm 304.

In relation to congregating inboard the body 110 in the collapsed configuration, and reaching to outboard the body 110 to different extents in the expanded configuration, the rear rotor arm 304, the side rotor arm 304 and the forward rotor arm 304 could have any combination of different individual and coordinated fixed and varying lengths. For instance, as shown, the rear rotor arm 304 and the side rotor arm 304 each have a fixed length, with the length of the side rotor arm 304 being longer than the length of the rear rotor arm 304. Moreover, the forward rotor arm 304 has a varying length. Although the length of the forward rotor arm 304 is longer than the length of the rear rotor arm 304 and the length of the side rotor arm 304 in the expanded configuration, in the collapsed configuration, the length of the forward rotor arm 304 is approximately the same as the length of the rear rotor arm 304. The forward rotor arm 304, as shown, is telescoping to realize the varying length thereof. Alternatively, the forward rotor arm 304 could be jointed to fold over itself to realize the varying length thereof.

Rotors

Figure 4:
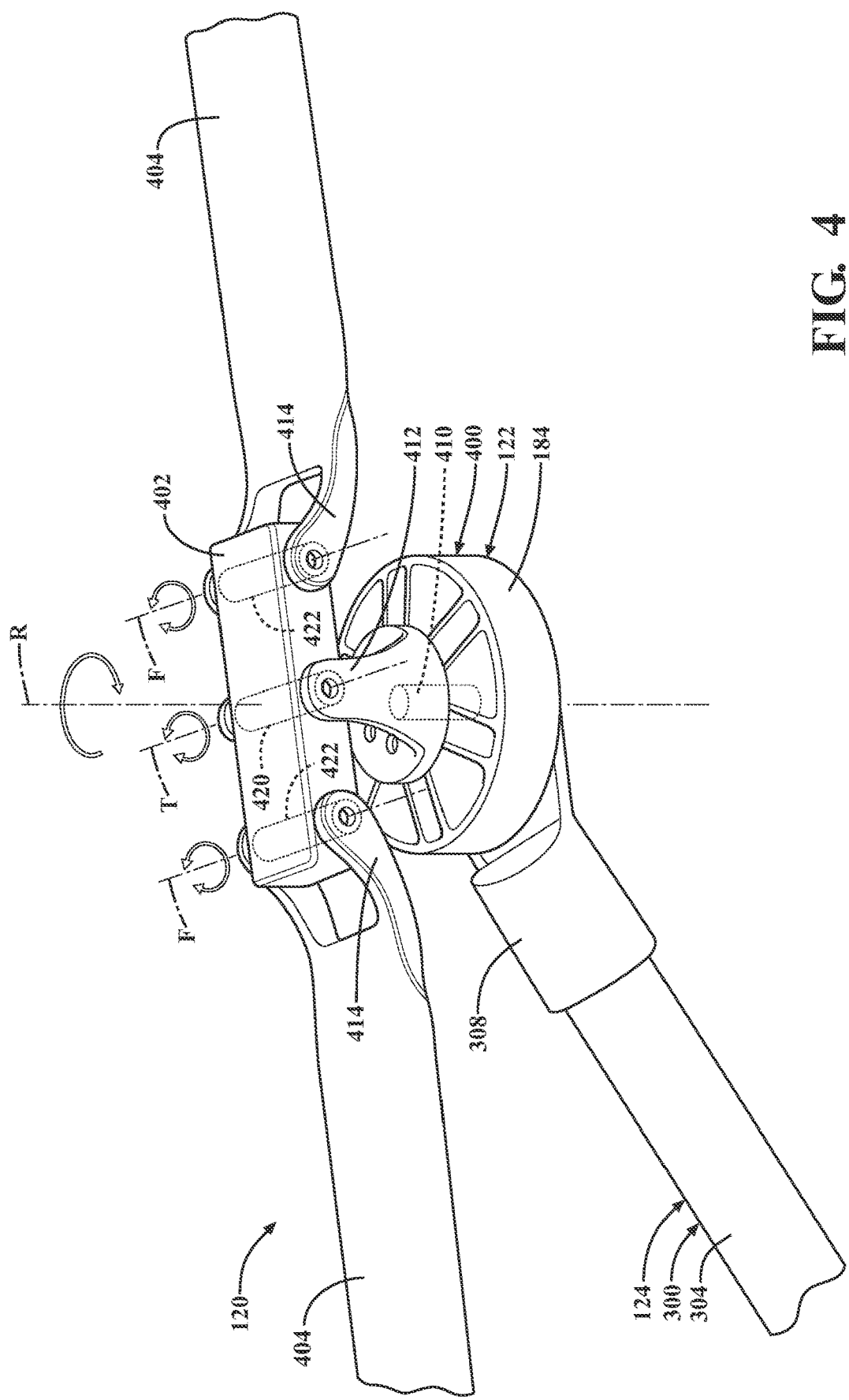
FIG. 4 is a portrayal of the flight module in isolation from the aerial vehicle using a partial perspective view, further showing aspects of a representative rotor, including blades, a hub, and a rotational drive system supporting the blades on the hub for rotation.

As shown with additional reference to FIG. 4, and as identified for a representative rotor 122 in its open configuration, each rotor 122 has a rotor axis R. The rotor axis R serves as the axis of rotation for the rotor 122. Among the propulsion elements of the propulsion system 162, as part of the rotor 122, the aerial vehicle 100 includes a rotational drive system 400. In addition to the rotational drive system 400, the rotor 122 includes a hub 402 mounted to the rotational drive system 400, and elongate, airfoil-shaped blades 404 mounted to the hub 402. Although the aerial vehicle 100, as shown, includes two blades 404 per rotor 122, it will be understood that this disclosure is applicable in principle to otherwise similar aerial vehicles 100 otherwise including multiple blades 404 per rotor 122.

The rotational drive system 400 and the hub 402 are axially aligned along the rotor axis R, and the blades 404 radiate from the rotor axis R. The rotational drive system 400 supports the blades 404 on the hub 402 for rotation about the rotor axis R. Relatedly, the rotational drive system 400 is operable to rotate the blades 404 on the hub 402 about the rotor axis R using energy from the energy system 160. As the product of rotating the blades 404 about the rotor axis R, the rotational drive system 400 is operable to power the rotors 122 to generate aerodynamic force along the rotor axis R.

In the electrified implementation, the rotor motor 184 is included along the rotor axis R as part of the rotational drive system 400. The rotor motor 184 includes an elongate output shaft 410 along the rotor axis R. The rotor motor 184 supports the output shaft 410 for rotation about the rotor axis R. Relatedly, the rotor motor 184 is operable to spin the output shaft 410 about the rotor axis R using electrical energy from the handling units 172.

In an otherwise similar aerial vehicle 100 including multiple rotor motors 184 per rotor 122, the rotor motors 184 could be axially aligned along the rotor axis R, and axially connected or, in other words, integrally married together with the output shaft 410. With the rotor motors 184 mutually supporting the output shaft 410 for rotation about the rotor axis R, the rotor motors 184 could be mutually operable to spin the output shaft 410 about the rotor axis R using electrical energy from the handling units 172. However, as opposed to their integral physical relationship, the rotor motors 184 could be individually operated. Accordingly, any combination of the rotor motors 184 could be operable to spin the output shaft 410 about the rotor axis R and, if one of the rotor motors 184 became inoperable, the remaining, operable rotor motors 184 could be employed to spin the output shaft 410 about the rotor axis R.

Although otherwise housed by the rotor motor 184, the output shaft 410 partially protrudes from the rotor motor 184. The hub 402 is mounted to the output shaft 410 with a hub mount 412 on the rotor axis R. Each blade 404 is mounted to the hub 402 with a blade mount 414 offset from the rotor axis R. The blade mounts 414 are circumferentially-spaced from one another about the rotor axis R. Each blade 404 has a root and a tip. With its tip leading away from the rotor axis R, each blade 404, by its root, is mounted to the hub 402 with a blade mount 414. With the blades 404 mounted to the hub 402 with the blade mounts 414, together, the blades 404 radiate from the rotor axis R. With the hub 402 thus mounted between the output shaft 410 and the blades 404, the rotor motor 184 supports the hub 402, and the blades 404 on the hub 402, on the output shaft 410 for rotation about the rotor axis R. Relatedly, as the product of spinning the output shaft 410 about the rotor axis R, the rotor motor 184 is operable to rotate the blades 404 on the hub 402 about the rotor axis R.

As part of the rotor 122, the blades 404 are supported for movement beyond rotation about the rotor axis R. In a teetering arrangement, the rotor 122 has a teetering axis T. The teetering axis T is on the rotor axis R, and orthogonal to the rotor axis R. Relatedly, the teetering axis T is local to the rotational drive system 400, including the output shaft 410, and to the hub 402. In relation to the teetering axis T, the hub mount 412 is rendered by a teetering hinge. With the hub mount 412 rendered by a teetering hinge, the hub 402, and the blades 404 on the hub 402, are pivotally mounted to the rotational drive system 400 by the hub mount 412, and the hub 402, and the blades 404 on the hub 402, are supported for teetering or, in other words, pivotation relative to the rotational drive system 400 about the teetering axis T. The hub mount 412, as shown, is rendered by a clevis-style or knuckle-style hinge that serves as a revolute joint defining a single rotational degree of freedom.

The rotor 122 has a flapping/folding axis F per blade 404. In a flapping arrangement, the flapping/folding axis F serves as a flapping axis F. In a folding arrangement, the same flapping/folding axis F serves as a folding axis F. For each blade 404, the flapping/folding axis F is offset from the rotor axis R, and tangent to the imaginary circle defined by the circumferentially-spaced arrangement of the blade mounts 414 about the rotor axis R. Relatedly, the flapping/folding axis F is local to the hub 402 and to the blade 404. In relation to the flapping/folding axis F, the blade mount 414 is rendered by a hinge. With the blade mount 414 rendered by a hinge, the blade 404 is pivotally mounted to the hub 402 by the blade mount 414, and the blade 404 is supported for flapping or, in other words, a limited amount (e.g., a few degrees) of pivotation relative to the hub 402 about the flapping axis F. Moreover, the blade 404 is supported for folding over the hub 402 or, in other words, approximately 180 degrees of pivotation relative to the hub 402 about the folding axis F. The blade mount 414, as shown, is rendered by a clevis-style or knuckle-style hinge that serves as a revolute joint defining a single rotational degree of freedom. Relatedly, the blade 404 has a fixed pitch relative to the hub 402.

When the blades 404 are rotated on the hub 402 about the rotor axis R by the operation of the rotational drive system 400, centrifugal forces on the blades 404 act to maintain them normal to the rotor axis R. At the same time, any combination of free teetering action by the hub 402 and free flapping action by the blades 404 relieves torsional moment, vibration and other loading on the blades 404, the hub 402, the rotational drive system 400 and otherwise on the rotor 122 resulting from the associated generation of aerodynamic force along the rotor axis R.

During the flight mode, with the rotors 122 in their open configurations, in relation to the circumferential spacing about the center of mass 200 of the aerial vehicle 100, the rotors 122, and in particular the blades 404, are sized to maximize their individual and combined disk area. The reconfiguration of a representative rotor 122 between its packaged configuration and its open configuration for purposes of being housed by the stowage compartment 108 is further represented in FIGS. 5A-5E. The description thereof follows with reference to the forward progression of FIGS. 5A-5E, in which the rotor 122 is shown being packaged. However, it will be understood that this disclosure, with reference to the reverse progression of FIGS. 5A-5E, is applicable in principle to the rotor 122 being opened.

For purposes of packaging the rotor 122, the rotor 122 includes two blades 404, and the blades 404 are unshrouded. The rotor arm 304 carrying the rotor 122 intersects or is otherwise crosswise to the rotor axis R. In relation to its flight position, in which the rotor 122 is perched overhead the body 110 and has a skyward-facing orientation, the rotor arm 304 is non-perpendicular to the rotor axis R.

As shown in FIG. 5A, in the open configuration, the blades 404 radiate from the rotor axis R. With the rotor 122 including two blades 404, the blades 404 are radially opposed about the rotor axis R. Relatedly, with the rotor arm 304 crosswise to the rotor axis R, the rotational drive system 400 supports the blades 404 on the hub 402 for rotation about the rotor axis R between rotational misalignment with the rotor arm 304 and, as shown, rotational alignment with the rotor arm 304. With the rotor arm 304 non-perpendicular to the rotor axis R, the blades 404 are angularly misaligned with the rotor arm 304.

As part of packaging the rotor 122, the blades 404, from rotational misalignment with the rotor arm 304, are rotated on the hub 402 about the rotor axis R into rotational alignment with the rotor arm 304. As shown in FIGS. 5B-5E, also as part of packaging the rotor 122, leveraging the teetering arrangement, the blades 404, from angular misalignment with the rotor arm 304, are teetered on the hub 402 into angular alignment with the rotor arm 304. Also as part of packaging the rotor 122, leveraging the folding arrangement, one blade 404, from radial opposition with the other blade 404, is folded over the hub 402 to alongside the other blade 404. The blades 404 could be rotated on the hub 402 about the rotor axis R into rotational alignment with the rotor arm 304, the blades 404 could be teetered on the hub 402 into angular alignment with the rotor arm 304, and one blade 404 could be folded over the hub 402 to alongside the other blade 404 any combination of ahead of, during and following one another. For instance, as shown, the blades 404 are rotated on the hub 402 about the rotor axis R into rotational alignment with the rotor arm 304 ahead of the blades 404 being teetered on the hub 402 into angular alignment with the rotor arm 304, and one blade 404 being folded over the hub 402 to alongside the other blade 404. Moreover, the blades 404 are teetered on the hub 402 into angular alignment with the rotor arm 304 during one blade 404 being folded over the hub 402 to alongside the other blade 404.

As shown in FIG. 5E, as the combined product of rotating the blades 404 on the hub 402 about the rotor axis R into rotational alignment with the rotor arm 304, teetering the blades 404 on the hub 402 into angular alignment with the rotor arm 304, and folding one blade 404 over the hub 402 to alongside the other blade 404, in the packaged configuration, the blades 404 extend from the rotational drive system 400 along the rotor arm 304. The blades 404, as shown, are alongside the rotor arm 304. In relation to the forward rotor arm 304 alternatively being jointed to fold over itself to realize the varying length thereof, the blades 404 could alternatively lead away from rotor arm 304.

Switching System

As noted above with reference to the forward progression of FIGS. 2A-2G, the control module 158 operates the switching system 164 to switch the aerial vehicle 100 from the ground mode to the flight mode. The control module 158 likewise operates the switching system 164 to switch the aerial vehicle 100 from the flight mode to the ground mode and otherwise between the ground mode and the flight mode. In relation to its operation by the control module 158, the switching system 164 includes the hatch actuators 190 and the reconfiguration actuators 192.

As shown in FIGS. 2B-2F, among the hatch actuators 190, the aerial vehicle 100 includes a hatch actuator 202 corresponding to a representative hatch 132. With the hatch 132, as shown, pivotally connected to the remainder of the body 110 for movement between its closed position and its open position, the hatch actuator 202 is mounted between the remainder of the body 110 and the hatch 132, and operable to pivot the hatch 132. As the product of pivoting the hatch 132, the hatch actuator 202 is operable to open the hatch 132, close the hatch 132 and otherwise move the hatch 132 between its closed position and its open position. As noted above, the control module 158 could operate the hatch actuator 202 to move the hatch 132 between its closed position and its open position in association with the commencement of deploying the flight module 120 and in association with the culmination of deploying the flight module 120.

As shown in FIGS. 3A and 3B, as part of the rotor frame 124, and the representative set of rotor carriers 300, among the reconfiguration actuators 192, the aerial vehicle 100 includes a carriage actuator 330. With the carriage 310 supported for movement along the carriage rail 302, the carriage actuator 330 is mounted between the carriage rail 302 and the carriage 310, and operable to move the carriage 310 along the carriage rail 302, as well as retentively hold the carriage 310 along the carriage rail 302. As the product of moving the carriage 310 along the carriage rail 302, the carriage actuator 330 is operable to pivot the rotor arms 304 from alongside the carriage rail 302 to overhanging the carriage rail 302, from overhanging the carriage rail 302 to alongside the carriage rail 302 and otherwise between alongside the carriage rail 302 and overhanging the carriage rail 302. As the product of retentively holding the carriage 310 along the carriage rail 302, the carriage actuator 330 is operable to retentively hold the rotor arms 304 alongside the carriage rail 302, overhanging the carriage rail 302 and between alongside the carriage rail 302 and overhanging the carriage rail 302.

As part of the rotor frame 124 and the representative forward rotor arm 304, also among the reconfiguration actuators 192, the aerial vehicle 100 includes a rotor arm actuator 332. With the forward rotor arm 304 telescoping to realize the varying length thereof, the rotor arm actuator 332 is mounted between telescoping segments of the forward rotor arm 304, and operable to telescope the telescoping segments, as well as retentively hold the telescoping segments. As the product of telescoping the telescoping segments, the rotor arm actuator 332 is operable to lengthen the forward rotor arm 304 and shorten the forward rotor arm 304. As the product of retentively holding the telescoping segments, the rotor arm actuator 332 is operable to retentively hold the length of the forward rotor arm 304.

In association with reconfiguring the rotor frame 124 between the collapsed configuration and the expanded configuration, the control module 158 could operate the carriage actuator 330 to pivot the rotor arms 304 between alongside the carriage rail 302 and overhanging the carriage rail 302, as well as retentively hold the rotor arms 304 alongside the carriage rail 302, overhanging the carriage rail 302 and between alongside the carriage rail 302 and overhanging the carriage rail 302. Moreover, the control module 158 could operate the rotor arm actuator 332 to vary the length of the forward rotor arm 304, as well as maintain the length of the forward rotor arm 304. For instance, following expanding the rotor frame 124, the control module 158 could operate the carriage actuator 330 to retentively hold the rotor arms 304 overhanging the carriage rail 302, with the rotor arms 304 thereby retentively carrying the rotors 122 in their flight positions, and operate the rotor arm actuator 332 to retentively hold a longer length of the forward rotor arm 304. Following collapsing the rotor frame 124, the control module 158 could operate the carriage actuator 330 to retentively hold the rotor arms 304 alongside the carriage rail 302, with the rotor arms 304 thereby retentively carrying the rotors 122 in their stowage position, and operate the rotor arm actuator 332 to retentively hold a shorter length of the forward rotor arm 304.

As shown in FIG. 4, as part of the representative rotor 122, also among the reconfiguration actuators 192, the aerial vehicle 100 includes a teetering actuator 420. With the blades 404 supported for teetering on the hub 402, the teetering actuator 420 is mounted between the rotational drive system 400 and the hub 402, and operable to teeter the blades 404 on the hub 402, as well as retentively hold the blades 404 from teetering on the hub 402. The teetering actuator 420 is also operable to alternatively disengage from between the rotational drive system 400 and the hub 402. As further represented in FIGS. 5A-5E, as the product of teetering the blades 404 on the hub 402, the teetering actuator 420 is operable to teeter the blades 404 on the hub 402 from angular misalignment with the rotor arm 304 into angular alignment with the rotor arm 304 and from angular alignment with the rotor arm 304 into angular misalignment with the rotor arm 304. As the product of retentively holding the blades 404 from teetering on the hub 402, the teetering actuator 420 is operable to retentively hold the blades 404 on the hub 402 in angular misalignment with the rotor arm 304 and in angular alignment with the rotor arm 304. As the product of alternatively disengaging from between the rotational drive system 400 and the hub 402, the teetering actuator 420 is operable to alternatively permit free teetering action by the hub 402.

Also as part of the representative rotor 122, and among the reconfiguration actuators 192, the aerial vehicle 100 includes folding actuators 422. For each blade 404, with the blade 404 supported for folding over the hub 402, a folding actuator 422 is mounted between the hub 402 and the blade 404, and operable to fold the blade 404 over the hub 402, as well as retentively hold the blade 404 from folding over the hub 402. The folding actuator 422 is also operable to alternatively disengage from between the hub 402 and the blade 404. As the product of folding the blade 404 over the hub 402, the folding actuator 422 is operable to fold the blade 404 over the hub 402 from radial opposition with the other blade 404 to alongside the other blade 404, from alongside the other blade 404 to radial opposition with the other blade 404 and otherwise between radial opposition with the other blade 404 and alongside the other blade 404. As the product of retentively holding the blade 404 from folding over the hub 402, the folding actuator 422 is operable to retentively hold the blade 404 in radial opposition with the other blade 404 and alongside the other blade 404. Following folding the blade 404 from alongside the other blade 404 to radial opposition with the other blade 404, as the product of alternatively disengaging from between the hub 402 and the blade 404, the folding actuator 422 is operable to alternatively permit free flapping action by the blade 404.

In association with reconfiguring the rotor 122 between its packaged configuration and its open configuration, the control module 158 could operate the teetering actuator 420 to teeter the blades 404 on the hub 402 from angular misalignment with the rotor arm 304 into angular alignment with the rotor arm 304 and from angular alignment with the rotor arm 304 into angular misalignment with the rotor arm 304, as well as retentively hold the blades 404 on the hub 402 in angular misalignment with the rotor arm 304 and in angular alignment with the rotor arm 304. The control module 158 could also operate the teetering actuator 420 to alternatively permit free teetering action by the hub 402. Moreover, the control module 158 could operate the folding actuator 422 to fold the blade 404 over the hub 402 from radial opposition with the other blade 404 to alongside the other blade 404, from alongside the other blade 404 to radial opposition with the other blade 404 and otherwise between radial opposition with the other blade 404 and alongside the other blade 404, as well as retentively hold the blade 404 in radial opposition with the other blade 404 and alongside the other blade 404. The control module 158 could also operate the folding actuator 422 to alternatively permit free flapping action by the blade 404. For instance, in association with packaging the rotor 122, the control module 158 could operate the teetering actuator 420 to teeter the blades 404 on the hub 402 from angular misalignment with the rotor arm 304 into angular alignment with the rotor arm 304, and operate the folding actuator 422 to fold the blade 404 over the hub 402 from radial opposition with the other blade 404 to alongside the other blade 404. Following packaging the rotor 122, the control module 158 could operate the teetering actuator 420 to retentively hold the blades 404 on the hub 402 in angular alignment with the rotor arm 304, and operate the folding actuator 422 to retentively hold the blade 404 alongside the other blade 404. Moreover, in association with opening the rotor 122, the control module 158 could operate the teetering actuator 420 to teeter the blades 404 on the hub 402 from angular alignment with the rotor arm 304 into angular misalignment with the rotor arm 304, and operate the folding actuator 422 to fold the blade 404 over the hub 402 from alongside the other blade 404 to radial opposition with the other blade 404. Following opening the rotor 122, the control module 158 could operate the teetering actuator 420 to retentively hold the blades 404 on the hub 402 in angular misalignment with the rotor arm 304 or to alternatively permit free teetering action by the hub 402, and operate the folding actuator 422 to retentively hold the blade 404 in radial opposition with the other blade 404 or to alternatively permit free flapping action by the blade 404.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A flight module, comprising:
    a rotor, the rotor including elongate blades and operable to generate aerodynamic force by rotating the blades; and
    a rotor carrier, the rotor carrier including:
        an elongate, upstanding carriage rail;
        a carriage supported for movement along the carriage rail;
        an elongate rotor arm carrying the rotor and supported atop the carriage rail for pivotation, including pivotation between alongside the carriage rail, where the rotor arm retentively carries the rotor in a stowage position, and overhanging the carriage rail, where the rotor arm retentively carries the rotor with a skyward-facing orientation in a flight position; and
        an elongate strut pivotally mounted between the carriage and the rotor arm, wherein pivotation of the strut between the carriage and the rotor arm is imparted with multiple rotational degrees of freedom; whereby
    with movement of the carriage along the carriage rail, the strut transfers loading between the carriage and the rotor arm for pivoting the rotor arm between alongside the carriage rail and overhanging the carriage rail, and thereby carrying the rotor on the rotor arm between its stowage position and its flight position.

2. The flight module of claim 1, wherein the rotor arm is pivotally mounted to the carriage rail.

3. The flight module of claim 1, wherein in relation to a reference sweep plane through where the rotor arm is supported atop the carriage rail for pivotation, the rotor in its stowage position and the rotor in its flight position, pivotation of the rotor arm between alongside the carriage rail and overhanging the carriage rail is biased for departure away from the reference sweep plane and landing toward the reference sweep plane.

4. The flight module of claim 1, wherein in relation to a reference sweep plane through where the rotor arm is supported atop the carriage rail for pivotation, the rotor in its stowage position and the rotor in its flight position, pivotation of the rotor arm from alongside the carriage rail to overhanging the carriage rail is biased for outboard departure away from the reference sweep plane and overhead landing toward the reference sweep plane, and pivotation of the rotor arm from overhanging the carriage rail to alongside the carriage rail is biased for overhead departure away from the reference sweep plane and inboard landing toward the reference sweep plane.

5. The flight module of claim 1, wherein pivotation of the rotor arm between alongside the carriage rail and overhanging the carriage rail is imparted with a single rotational degree of freedom, and with pivotation of the rotor arm between alongside the carriage rail and overhanging the carriage rail, the rotor arm sweeps along a conical surface.

6. The flight module of claim 1, wherein the rotor arm has a variable length.

7. The flight module of claim 1, wherein alongside the carriage rail, the rotor arm retentively carries the rotor with an outboard-facing orientation in its stowage position.

8. A flight module, comprising:
    rotors, each rotor including elongate blades and operable to generate aerodynamic force by rotating the blades; and
    a set of rotor carriers, the set of rotor carriers including:
        a shared elongate, upstanding carriage rail;

a shared carriage supported for movement along the carriage rail;

elongate rotor arms, the rotor arms including a rotor arm per rotor, wherein for each rotor arm and rotor, the rotor arm carries the rotor and is supported atop the carriage rail for pivotation, including pivotation between alongside the carriage rail, where the rotor arm retentively carries the rotor in a stowage position, and overhanging the carriage rail, where the rotor arm retentively carries the rotor with a skyward-facing orientation in a flight position, and for at least one rotor arm and rotor, in relation to a reference sweep plane through where the rotor arm is supported atop the carriage rail for pivotation, the rotor in its stowage position and the rotor in its flight position, pivotation of the rotor arm between alongside the carriage rail and overhanging the carriage rail is biased for departure away from the reference sweep plane and landing toward the reference sweep plane; and elongate struts, the struts including a strut per rotor arm, wherein for each rotor arm and strut, the strut is pivotally mounted between the carriage and the rotor arm; whereby with movement of the carriage along the carriage rail, the struts transfer loading between the carriage and the rotor arms for pivoting the rotor arms between congregation alongside the carriage rail and branchingly overhanging the carriage rail, and thereby carrying the rotors on the rotor arms between their stowage positions and their flight positions.

9. The flight module of claim 8, wherein each rotor arm is pivotally mounted to the carriage rail.

10. The flight module of claim 8, wherein for the at least one rotor arm and rotor pivotation of the rotor arm from alongside the carriage rail to overhanging the carriage rail is biased for outboard departure away from the reference sweep plane and overhead landing toward the reference sweep plane, and pivotation of the rotor arm from overhanging the carriage rail to alongside the carriage rail is biased for overhead departure away from the reference sweep plane and inboard landing toward the reference sweep plane.

11. The flight module of claim 8, wherein pivotation of each rotor arm between alongside the carriage rail and overhanging the carriage rail is imparted with a single rotational degree of freedom, and for at least one rotor arm and rotor, with pivotation of the rotor arm between alongside the carriage rail and overhanging the carriage rail, the rotor arm sweeps along a conical surface.

12. The flight module of claim 8, wherein pivotation of each rotor arm between alongside the carriage rail and overhanging the carriage rail is imparted with a single rotational degree of freedom, and for at least one rotor arm, rotor and strut, with pivotation of the rotor arm between alongside the carriage rail and overhanging the carriage rail, the rotor arm sweeps along a conical surface, and pivotation of the strut between the carriage and the rotor arm is imparted with multiple rotational degrees of freedom.

13. The flight module of claim 8, wherein at least one rotor arm has a variable length.

14. The flight module of claim 8, wherein for at least one rotor arm and rotor, alongside the carriage rail, the rotor arm retentively carries the rotor with an outboard-facing orientation in its stowage position.

15. A flight module, comprising:
a rotor, the rotor including elongate blades and operable to generate aerodynamic force by rotating the blades;
a rotor arm mount having a rotor arm mount axis and defining a single rotational degree of freedom about the rotor arm mount axis; and
an elongate rotor arm carrying the rotor and pivotally mounted by the rotor arm mount, with the rotor arm non-perpendicular to the rotor arm mount axis, the rotor arm mount directing pivotation of the rotor arm with which the rotor arm sweeps along a conical surface, including pivotation between where the rotor arm retentively carries the rotor in a stowage position and where the rotor arm retentively carries the rotor with a skyward-facing orientation in a flight position.

16. The flight module of claim 15, further comprising:
an elongate, upstanding carriage rail, the rotor arm pivotally mounted by the rotor arm mount atop the carriage rail for pivotation directed by the rotor arm mount, including pivotation between alongside the carriage rail, where the rotor arm retentively carries the rotor in its stowage position, and overhanging the carriage rail, where the rotor arm retentively carries the rotor with a skyward-facing orientation in its flight position;
a carriage supported for movement along the carriage rail; and
an elongate strut pivotally mounted between the carriage and the rotor arm; whereby
with movement of the carriage along the carriage rail, the strut transfers loading between the carriage and the rotor arm for pivoting the rotor arm between alongside the carriage rail and overhanging the carriage rail, and thereby carrying the rotor on the rotor arm between its stowage position and its flight position.

17. The flight module of claim 16, wherein alongside the carriage rail, the rotor arm retentively carries the rotor with an outboard-facing orientation in its stowage position.

18. The flight module of claim 15, wherein the rotor arm has a variable length.

* * * * *